(12) United States Patent
Jang et al.

(10) Patent No.: US 10,180,663 B2
(45) Date of Patent: *Jan. 15, 2019

(54) WATCH TYPE MOBILE TERMINAL AND CONTROL METHOD FOR THE MOBILE TERMINAL

(71) Applicant: LG ELECTRONICS INC., Seoul (KR)

(72) Inventors: Yujune Jang, Seoul (KR); Taeseong Kim, Seoul (KR); Jeongyoon Rhee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 301 days.

This patent is subject to a terminal disclaimer.

(21) Appl. No.: 14/631,514

(22) Filed: Feb. 25, 2015

(65) Prior Publication Data

US 2015/0331394 A1 Nov. 19, 2015

(30) Foreign Application Priority Data

May 19, 2014 (KR) ........................ 10-2014-0059892

(51) Int. Cl.
*G06F 3/0488* (2013.01)
*G04G 21/08* (2010.01)
(Continued)

(52) U.S. Cl.
CPC ............. *G04G 21/08* (2013.01); *G04G 21/02* (2013.01); *G04G 21/04* (2013.01); *G06F 1/163* (2013.01)

(58) Field of Classification Search
CPC ........ G06F 3/017; G06F 1/163; G06F 3/0488; G04G 21/08; G04G 21/02
See application file for complete search history.

(56) References Cited

U.S. PATENT DOCUMENTS

| | | | | |
|---|---|---|---|---|
| 4,766,419 A | * | 8/1988 | Hayward | ................. G07C 1/32 340/545.2 |
| 2005/0192044 A1 | * | 9/2005 | Travis | ................. H04M 1/0254 455/550.1 |

(Continued)

FOREIGN PATENT DOCUMENTS

| | | |
|---|---|---|
| CN | 102117178 | 7/2011 |
| CN | 103347111 | 10/2013 |

(Continued)

OTHER PUBLICATIONS

European Patent Office Application Serial No. 15161063.1, Search Report dated Jan. 15, 2016, 6 pages.

(Continued)

*Primary Examiner* — Joseph Haley
(74) *Attorney, Agent, or Firm* — Lee, Hong, Degerman, Kang & Waimey

(57) ABSTRACT

A watch type mobile terminal is provided that is wearable on a wrist. The watch type mobile terminal includes a main body, a band unit, a sensing unit and a controller. The main body has a display unit. The band unit is connected to the main body so that the mobile terminal surrounds the user's wrist. The sensing unit senses a user input applied to the band unit. The controller processes the user input applied to the band unit as a control command with respect to the mobile terminal.

18 Claims, 31 Drawing Sheets

(51) Int. Cl.
*G04G 21/02* (2010.01)
*G04G 21/04* (2013.01)
*G06F 1/16* (2006.01)

(56) References Cited

U.S. PATENT DOCUMENTS

| 2010/0219943 A1* | 9/2010 | Vanska | G06F 1/163 340/407.1 |
| 2012/0147535 A1* | 6/2012 | Ahn | G06F 1/1641 361/679.01 |
| 2013/0044215 A1* | 2/2013 | Rothkopf | G06F 1/163 348/143 |
| 2013/0241896 A1* | 9/2013 | Ishitsuka | G06F 3/0416 345/178 |
| 2016/0011663 A1* | 1/2016 | Starner | G06F 1/163 340/407.2 |

FOREIGN PATENT DOCUMENTS

| CN | 103576913 | 2/2014 |
| CN | 103686051 | 3/2014 |
| JP | 11-146042 | 5/1999 |
| KR | 10-2011-0008607 | 1/2011 |

OTHER PUBLICATIONS

Korean Intellectual Property Office Application Serial No. 10-2014-0059892, Office Action dated Jul. 13, 2015, 2 pages.
State Intellectual Property Office of the People's Republic of China Application Serial No. 201510253258.7, Office Action dated Feb. 4, 2017, 15 pages.

* cited by examiner

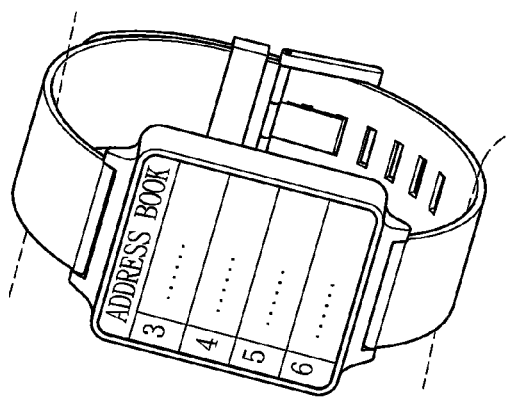
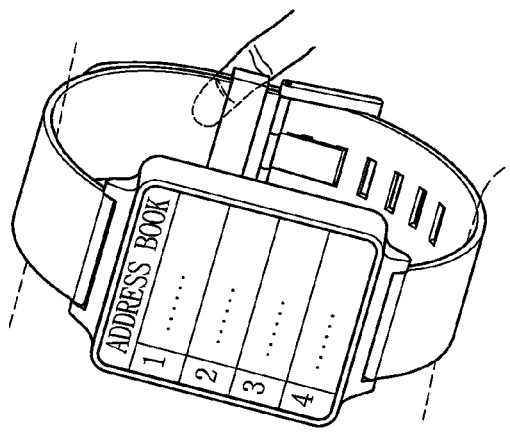
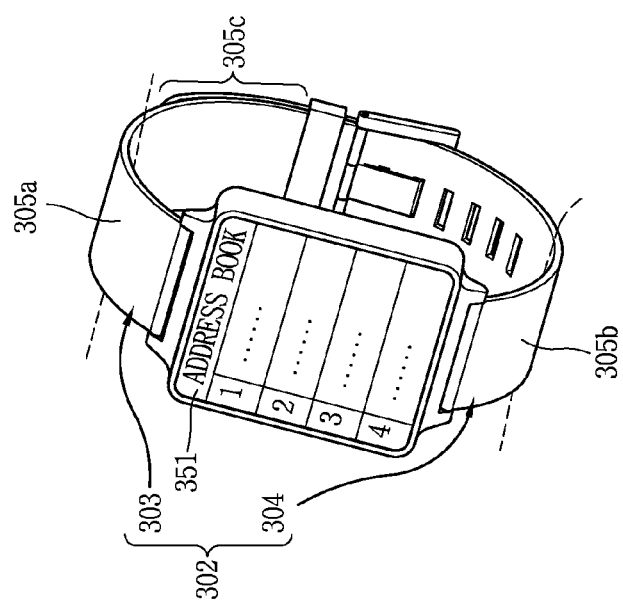
FIG. 5B(a)  FIG. 5B(b)  FIG. 5B(c)

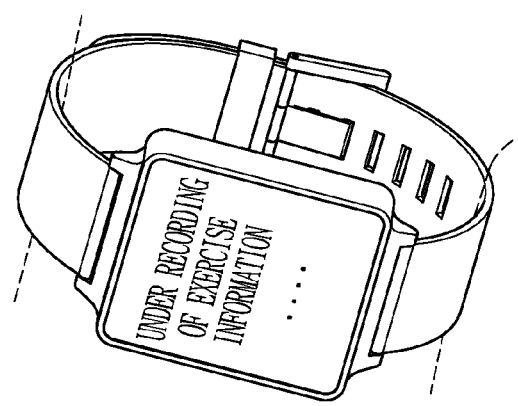
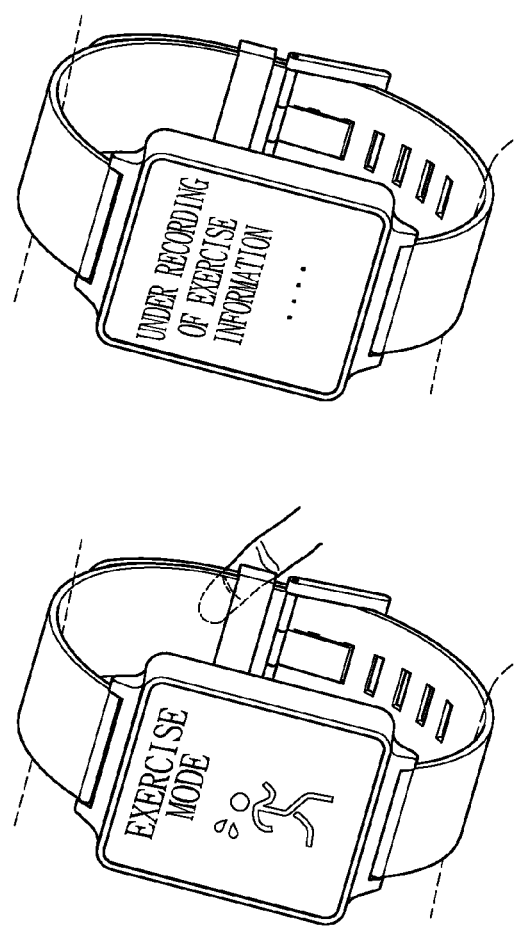
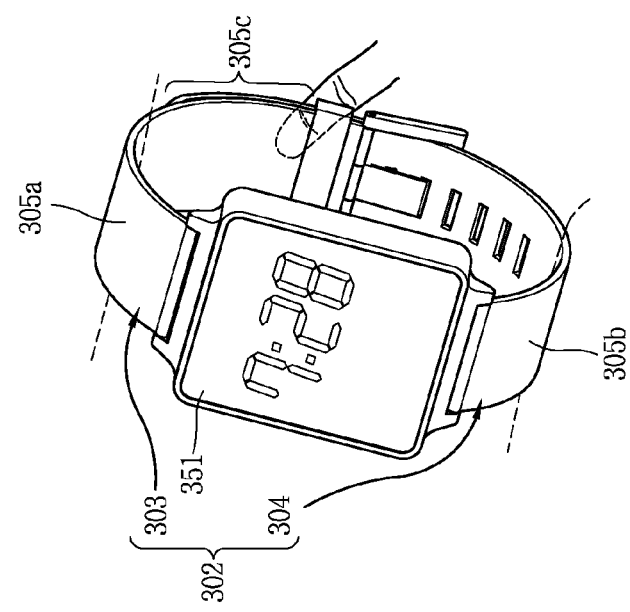

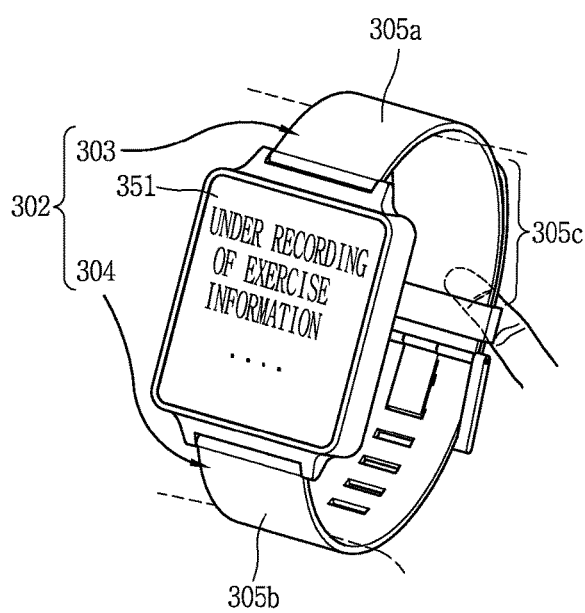 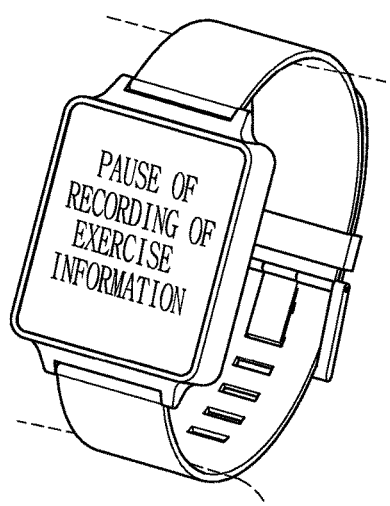
FIG. 8B(a)  FIG. 8B(b)

FIG. 9A(a)   FIG. 9A(b)
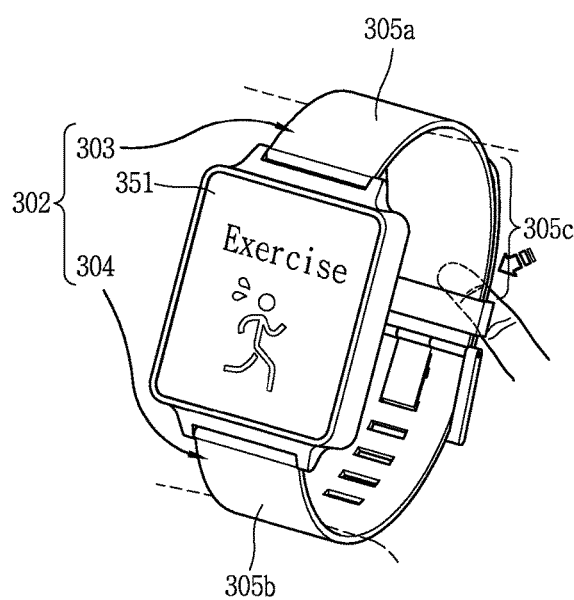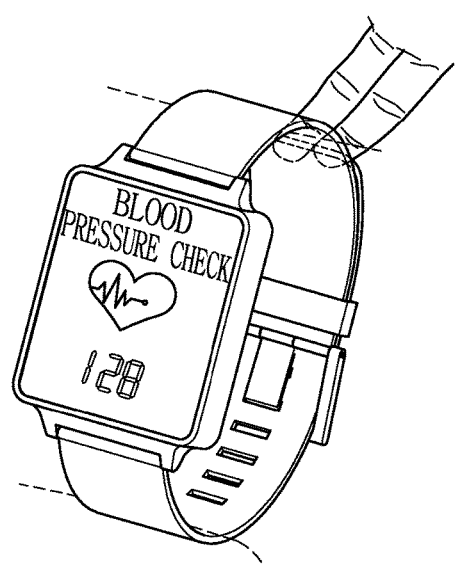

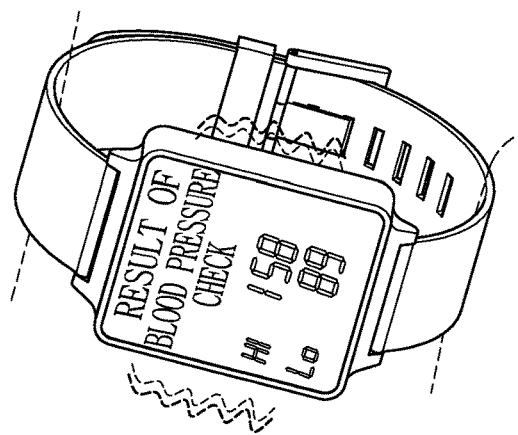
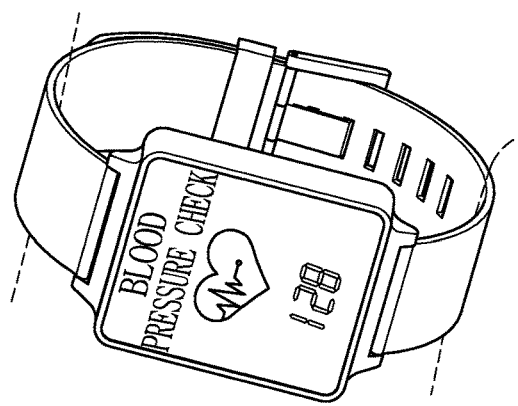
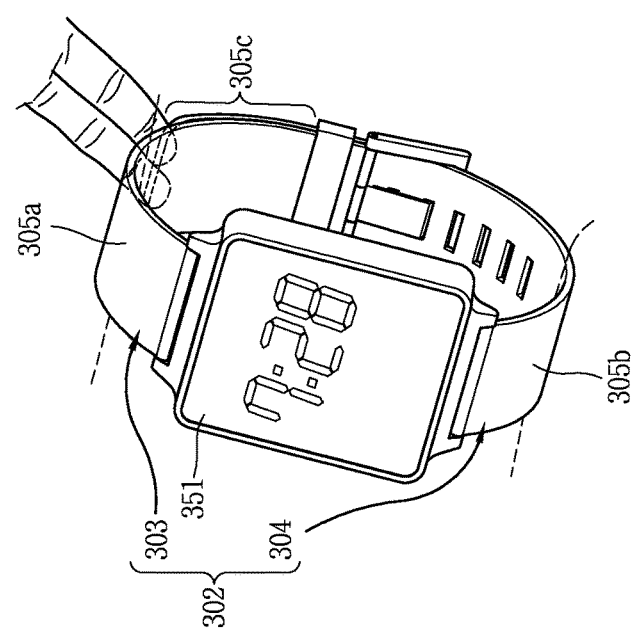

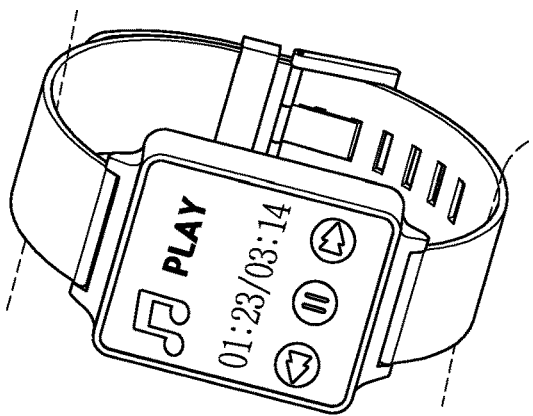
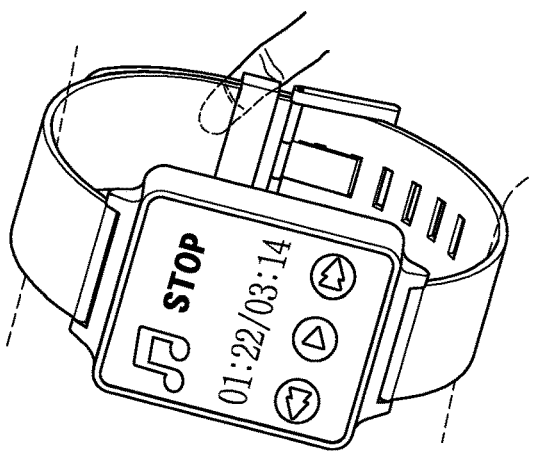
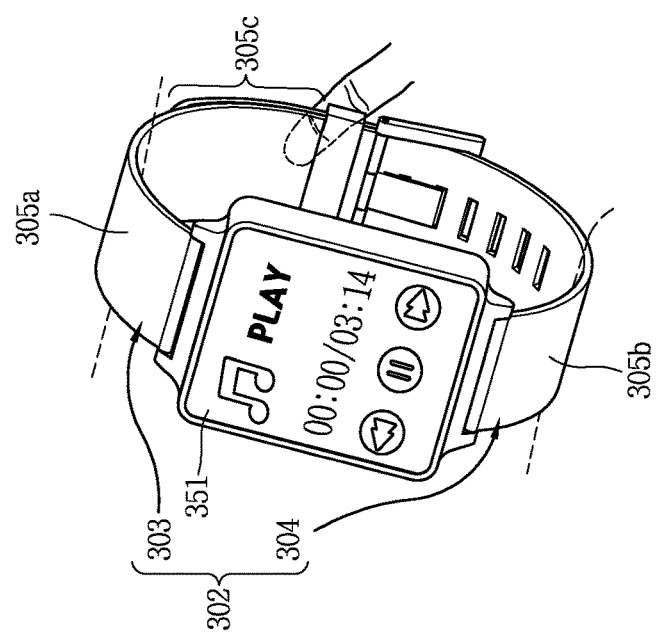

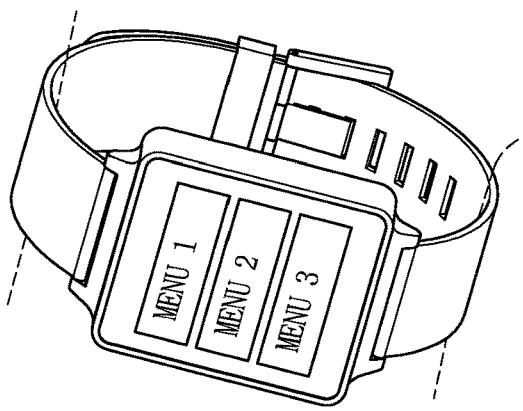
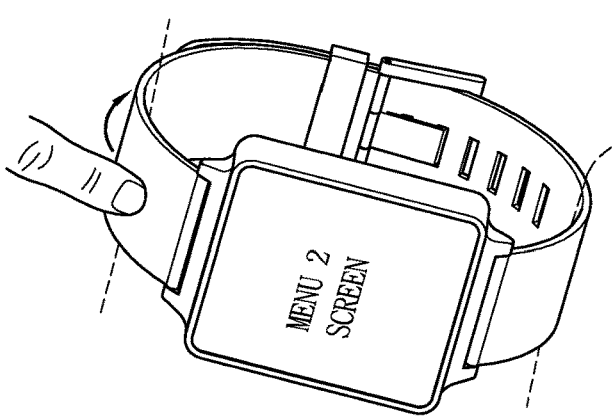
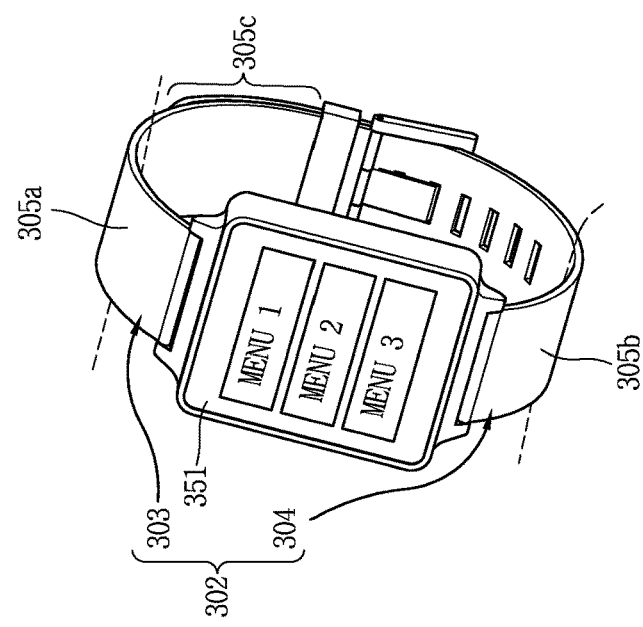

FIG. 12C(a)  FIG. 12C(b)
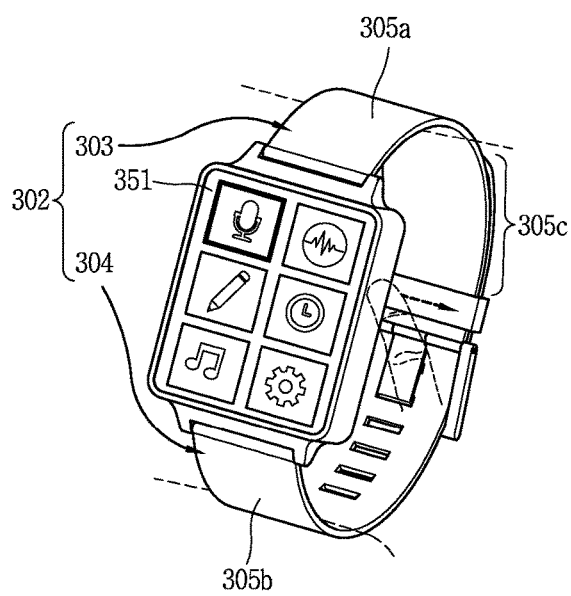
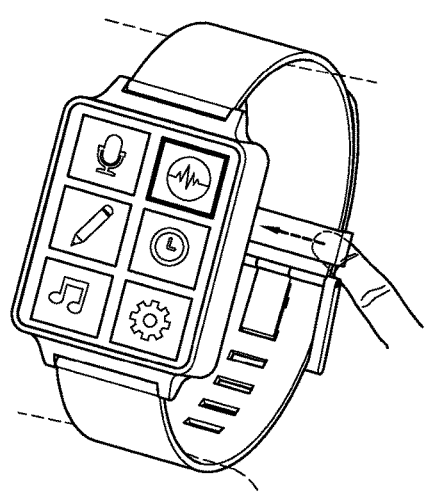

PLEASE, WAKE UP

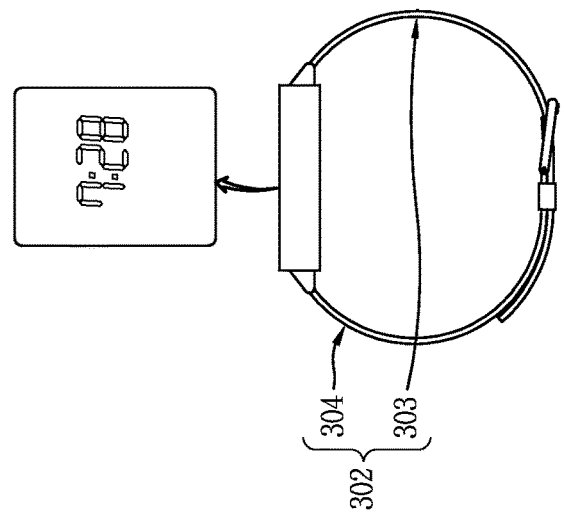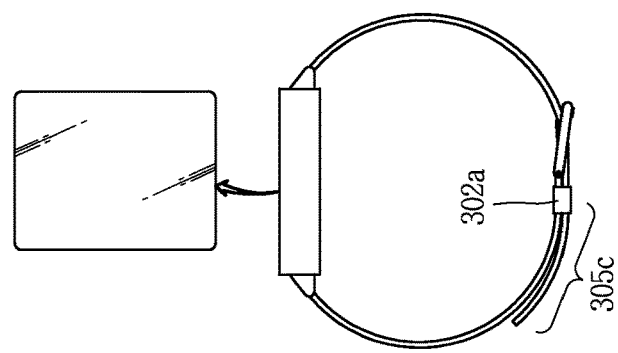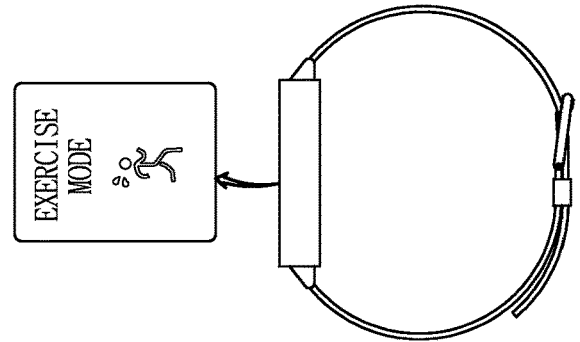

FIG. 18(a)
FIG. 18(b)
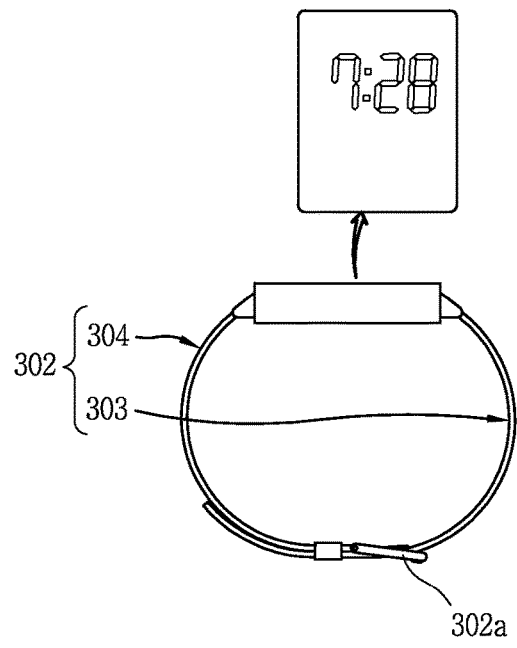
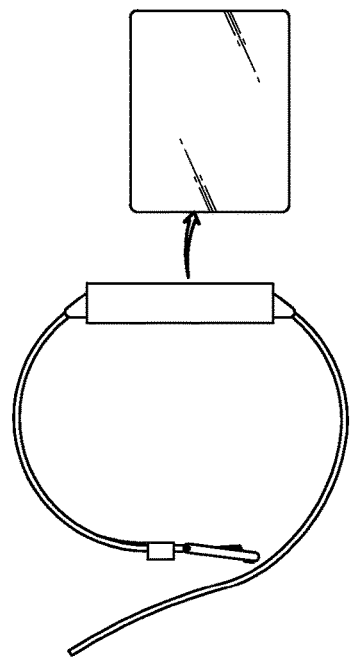

WATCH TYPE MOBILE TERMINAL AND CONTROL METHOD FOR THE MOBILE TERMINAL

CROSS-REFERENCE TO RELATED APPLICATIONS

Pursuant to 35 U.S.C. § 119(a), this application claims the benefit of earlier filing date and right of priority to Korean Application No. 10-2014-0059892, filed on May 19, 2014, the contents of which is incorporated by reference herein in its entirety.

FIELD OF THE INVENTION

The present invention relates to a watch type mobile terminal wearable on a wrist.

DESCRIPTION OF THE RELATED ART

In general, a terminal may be classified into a mobile (portable) terminal and a stationary terminal according to a moveable state. The mobile terminal may be also classified into a handheld terminal and a vehicle mount terminal according to a user's carrying method.

As functions of the terminal become more diversified, the terminal can support more complicated functions such as capturing images or video, reproducing music or video files, playing games and receiving broadcast signals. By comprehensively and collectively implementing such functions, the mobile terminal may be embodied in the form of a multimedia player or a device. Various attempts have been made to implement complicated functions in such a multimedia device by using hardware or software. For instance, a user interface (UI), which allows a user to search for or select functions in an easy and convenient manner is provided.

As the mobile terminal is regarded as a personal belonging for expressing the user's own personality, various design shapes of the mobile terminal are required. The design shapes also include structural changes and improvements which enable the user to more conveniently use the mobile terminal. A watch type mobile terminal that can be used while being worn on a user's wrist may be considered as one of the structural changes and improvements.

SUMMARY OF THE INVENTION

Therefore, an aspect of the detailed description is to provide a watch type mobile terminal in which new user inputs and new outputs of the terminal are possible.

Another aspect of the detailed description is to provide a watch type mobile terminal in which a plurality of input forms can be defined using a band unit.

To achieve these and other advantages and in accordance with the purpose of this specification, as embodied and broadly described herein, a watch type mobile terminal wearable on a wrist includes: a main body configured to have a display unit; a band unit connected to the main body so that the mobile terminal is worn on the wrist, the band unit surrounding the wrist; a sensing unit configured to sense a user input applied to the band unit; and a controller configured to process the user input applied to the band unit as a control command with respect to the mobile terminal.

In one exemplary embodiment, the band unit may have a plurality of areas for sensing the user input. The controller may process different commands based on an area to which the user input is applied among the plurality of areas. The band unit may include first and second bands respectively connected to both sides of the main body. The plurality of areas may include a first area formed in the first band, a second area formed in the second band, and a third area in which the first and second bands are overlapped with each other or connected to each other. The third area may be an area for connecting the first and second bands to be engaged with each other at end portions of the first and second bands.

In one exemplary embodiment, the band unit may be made to sense a touch input, and the user input may be a touch input applied to the band unit. The controller may process different control commands based on a kind of the touch input applied to the same area of the band unit.

In one exemplary embodiment, control related to the display unit may be performed by the control command. If the user is applied to the band unit in a state in which screen information is output on the display unit, at least one portion of the screen information may be changed. If the user input is applied to the band unit in a state in which an indicator for indicating an object to be selected is included in the screen information, the position of the indicator may be moved in response to the user input.

In one exemplary embodiment, if the user input is applied to the band unit in a state in which an event occurs, control related to the event may be performed. The controller may output notification information for notifying that the event has occurred. The outputting of the notification information may be controlled corresponding to that the user input is applied in the state in which the notification information is output. The controller may output detailed information corresponding to the event through at least one of predetermined manners, corresponding to the user input. The controller may transmit predetermined information to another terminal related to the event, corresponding to the user input.

In one exemplary embodiment, the band unit may include a first band connected to one side of the main body, and a second band connected to the other side of the main body. A double band unit may be formed by overlapping or connection between the first and second band. The sensing unit may be made to sense a user input applied to the double band unit. The control commands may be differently set based on a position at which a touch input in the double band unit. The user input may include movement with respect to at least one portion of the part forming the double band unit in the first and second bands.

In one exemplary embodiment, if the user input is applied to the band unit, the controller may execute a predetermined operation mode. The execution of the operation mode may be performed regardless of whether the display unit is activated. A function performed in the operation mode may be controlled using an additional user input applied to the band unit. The user input may be any one of a plurality of touch inputs applied to the band unit. Each of the plurality of touch inputs may be defined as an execution command with respect to any one of a plurality of operation modes.

In one exemplary embodiment, the band unit may include first and second bands respectively connected to both sides of the main body, the first and second bands being fastened to each other. The controller may process different control commands based on when the user input is applied in the state in which the first and second bands are fastened to each other and when the fastening is released.

In one exemplary embodiment, a function being performed in the state in which the first and second bands are fastened to each other may be stopped when the fastening is released. If the fastening is released, notification information for notifying that the performance of the function is impossible may be output.

Further scope of applicability of the present application will become more apparent from the detailed description given hereinafter. However, it should be understood that the detailed description and specific examples, while indicating preferred embodiments of the invention, are given by way of illustration only and various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIGS. 15(a), 15(b), 16(a), 16(b) and 16(c) are conceptual diagrams illustrating a method for activating a sensing unit; and FIGS. 17(a), 17(b), 18(a) and 18(b) are conceptual diagrams illustrating control methods based on fastening of a band unit.

DETAILED DESCRIPTION OF EXEMPLARY EMBODIMENTS

Description will now be given in detail of the exemplary embodiments, with reference to the accompanying drawings. For the sake of brief description with reference to the drawings, the same or equivalent components will be provided with the same reference numbers, and description thereof will not be repeated. A suffix "module" or "unit" used for constituent elements disclosed in the following description is merely intended for easy description of the specification, and the suffix itself does not give any special meaning or function. In describing the present invention, if a detailed explanation for a related known function or construction is considered to unnecessarily divert the gist of the present invention, such explanation has been omitted but would be understood by those skilled in the art. The accompanying drawings are used to help easily understood the technical idea of the present invention and it should be understood that the idea of the present invention is not limited by the accompanying drawings.

A terminal in the present description may include a mobile terminal such as a portable phone, a smart phone, a notebook computer, a digital broadcasting terminal, Personal Digital Assistants (PDA), Portable Multimedia Player (PMP), a navigation system, a slate PC, a tablet PC, an ultra book, a wearable device (e.g., smart watch), a glass-type terminal (e.g., smart glass), a head mounted display (HMD), etc.

However, it will be obvious to those skilled in the art that the present invention may be also applicable to a fixed terminal such as a digital TV, a desktop computer and a digital signage, except for specific configurations for mobility.

Figure 1A:
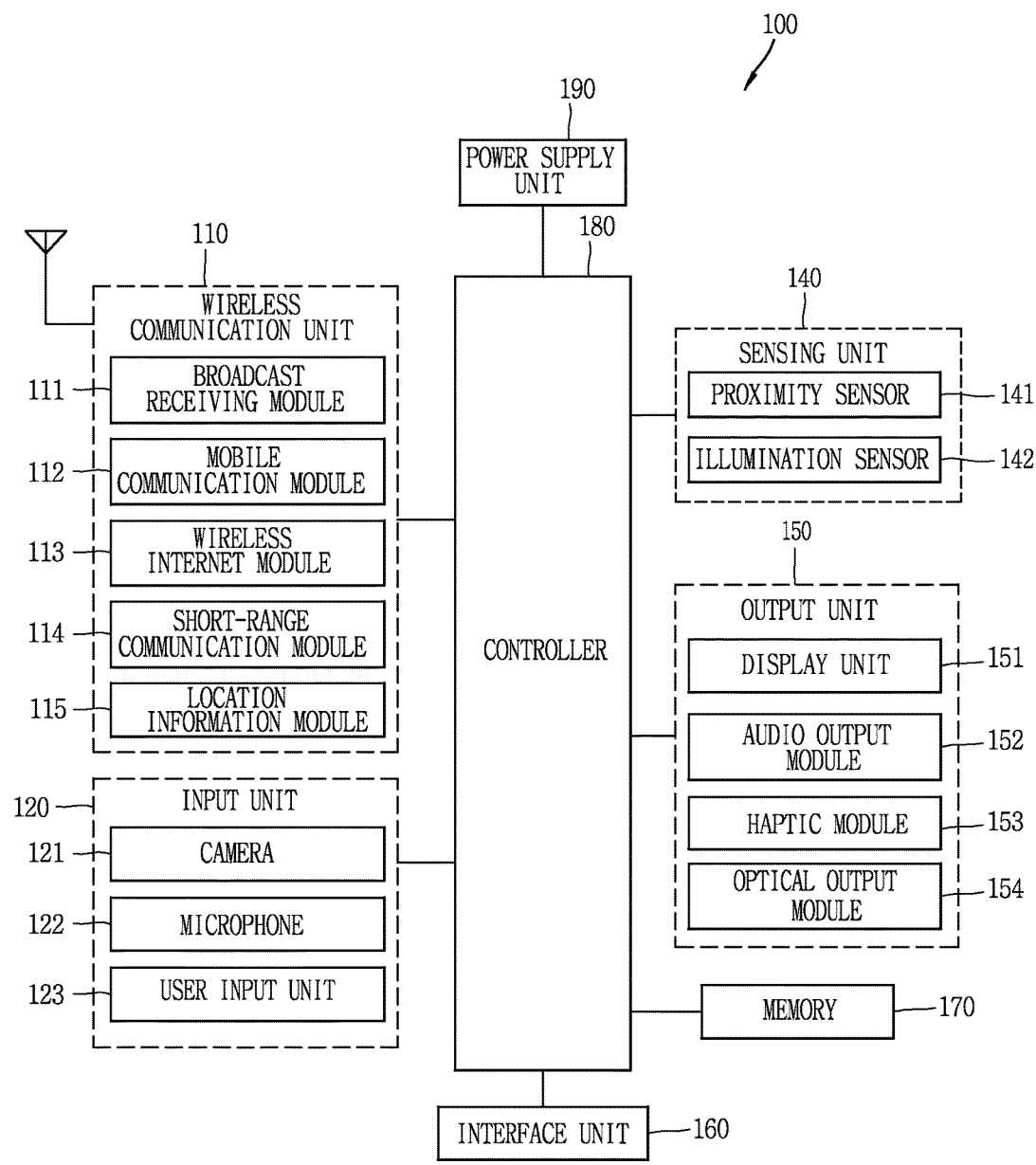
FIG. 1A is a block diagram illustrating a mobile terminal according to an exemplary embodiment.
Figure 1B:
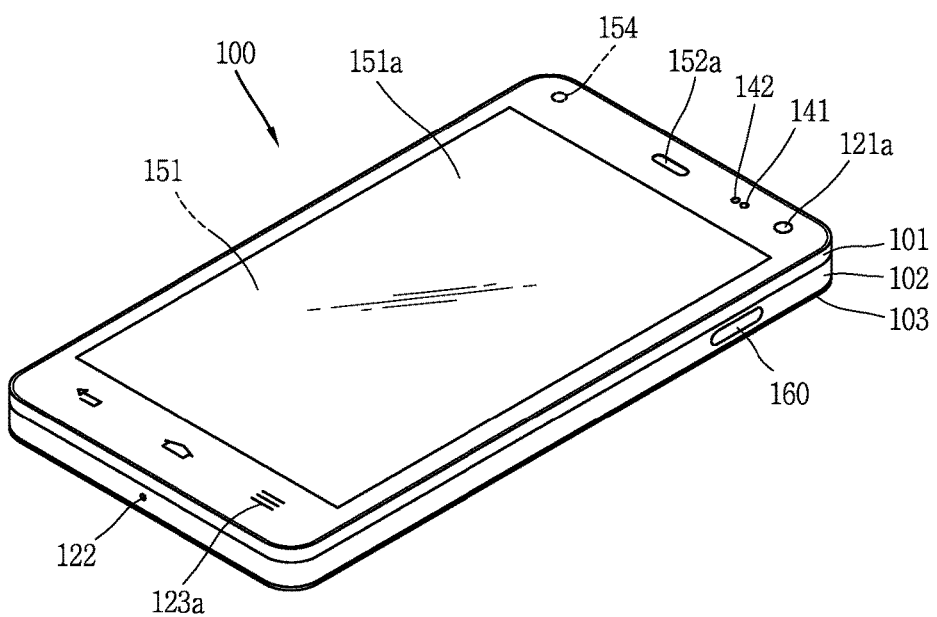
FIGS. 1B and 1C are conceptual diagrams illustrating an example of the mobile terminal viewed in different directions according to the exemplary embodiment.
Figure 1C:
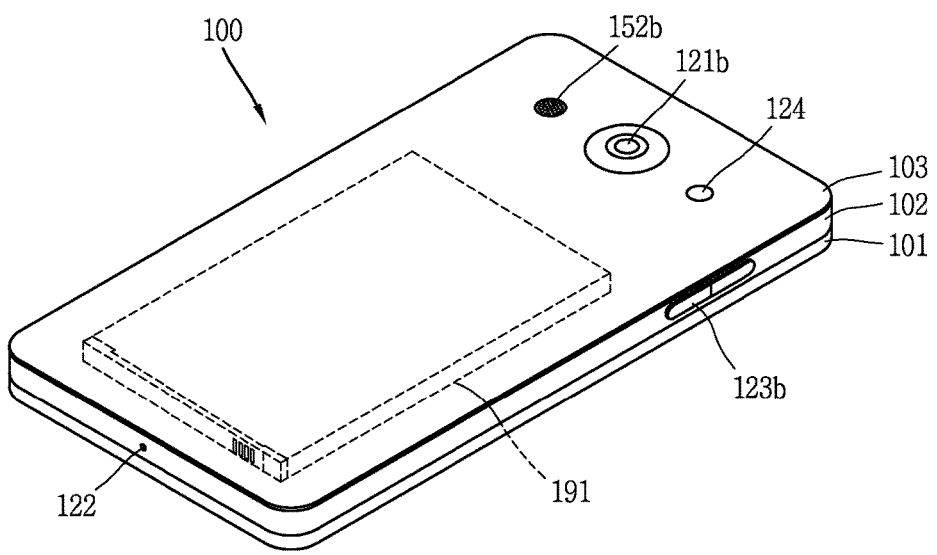

Reference is now made to FIGS. 1A-1C, where FIG. 1A is a block diagram of a mobile terminal in accordance with the present invention, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components of FIG. 1A is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components will be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HAUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee™, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the mobile terminal. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority to use the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supplies the appropriate power required for operating elements and components included in the mobile terminal 100. The power supply unit 190 may include a battery, which is typically rechargeable or detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using an inductive coupling method based on magnetic induction or a magnetic resonance coupling method based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The display unit 151, the first audio output module 152a, the second audio output module 152b, the proximity sensor 141, the illumination sensor 142, the optical output module 154, a first camera 121a, a second camera 121b, the first manipulation unit 123a, the second manipulation unit 123b, the microphone 122, the interface 160, etc. may be provided at the mobile terminal 100.

As shown in FIGS. 1B and 1C, the display unit 151, the first audio output module 152a, the proximity sensor 141, the illumination sensor 142, the optical output module 154, the first camera 121a and the first manipulation unit 123a are arranged on a front surface of the terminal body. The second manipulation unit 123b, the microphone 122 and the interface 160 are arranged on side surfaces of the terminal body. And the second audio output module 152b and the second camera 121b are arranged on a rear surface of the terminal body.

However, it is to be understood that alternative arrangements are possible and within the teachings herein. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable mobile terminals. Examples of such suitable mobile terminals include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two mobile terminals, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver, and the second audio output module 152b may be implemented in the form of a loud speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may be implemented in a user's non-tactile manner, e.g., by a proximity touch, a hovering touch, etc.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (refer to FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 2:
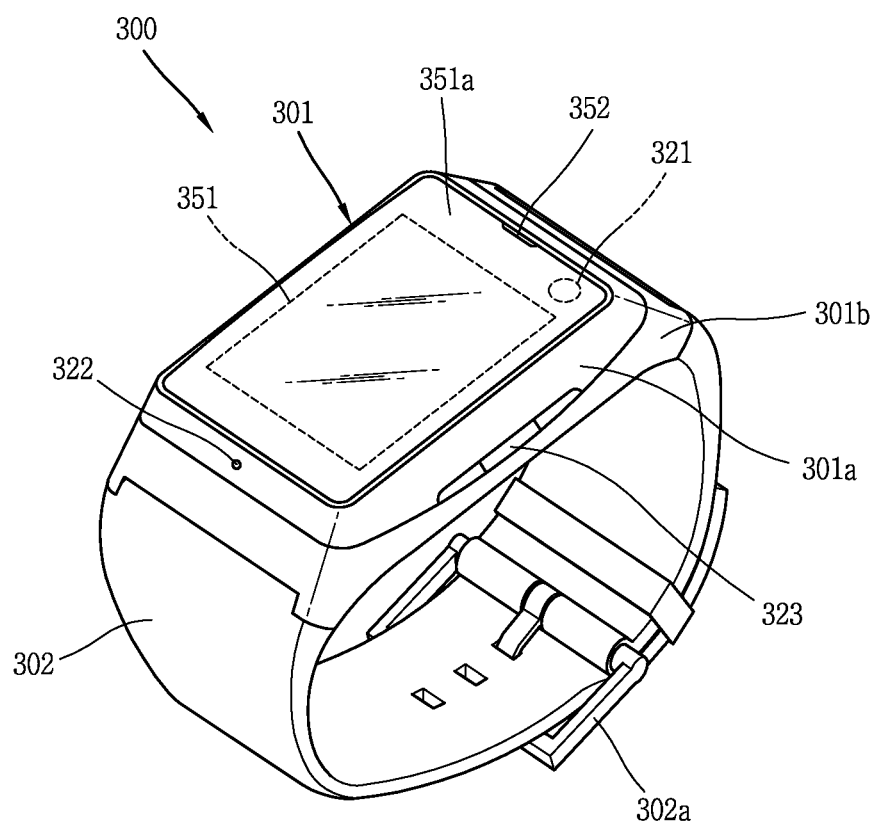
FIG. 2 is a perspective view illustrating an example of a watch type mobile terminal according to another exemplary embodiment.

FIG. 2 is a perspective view illustrating one example of a watch-type mobile terminal 300 in accordance with another exemplary embodiment. As illustrated in FIG. 2, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Meanwhile, as described above, the controller 180 (see FIG. 1A) may control functions of the terminal using a band of the mobile terminal.

A method for defining a plurality of input forms and controlling operations of the display unit 351 using the input forms is provided as a control method. Hereinafter, a method for controlling functions of the watch type mobile terminal using the band will be described in detail with reference to the accompanying drawings.

For convenience of illustration, hereinafter, the band will be divided into first and second bands connected to each other by a fastener 302a. In addition, the band 302 described with reference to FIG. 2 will be referred to as a band unit 302 as a meaning that is a portion including the first and second bands. In the present invention, the first band is described using reference numeral "303", and the second band is described using reference numeral "304". Further, with respect to contents applicable to both the first and second bands without division into the first and second bands, the first and second bands will be described as the "band unit 302" instead of the reference numerals for representing the first and second bands.

Figure 3:
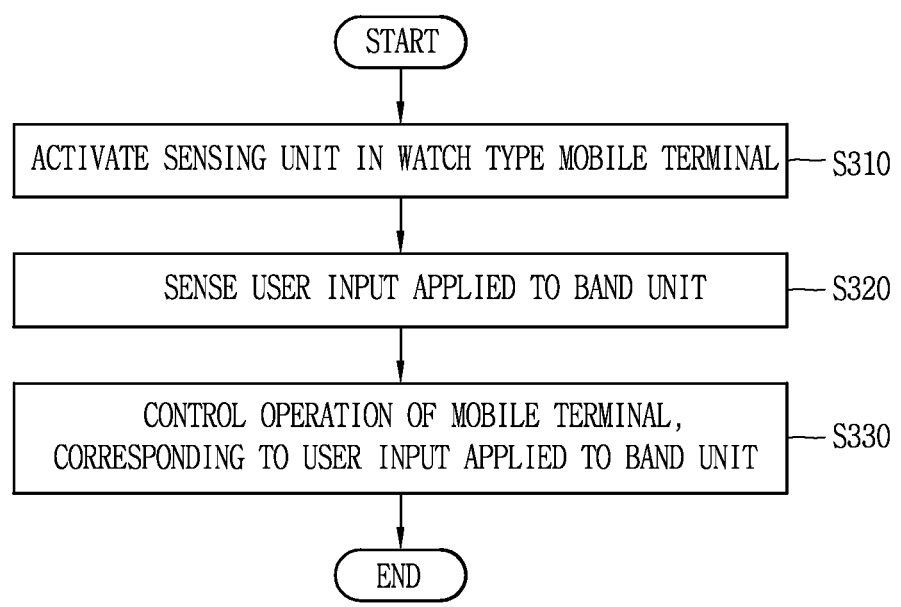
FIG. 3 is a flowchart illustrating a control method according to an exemplary embodiment.
Figure 4:
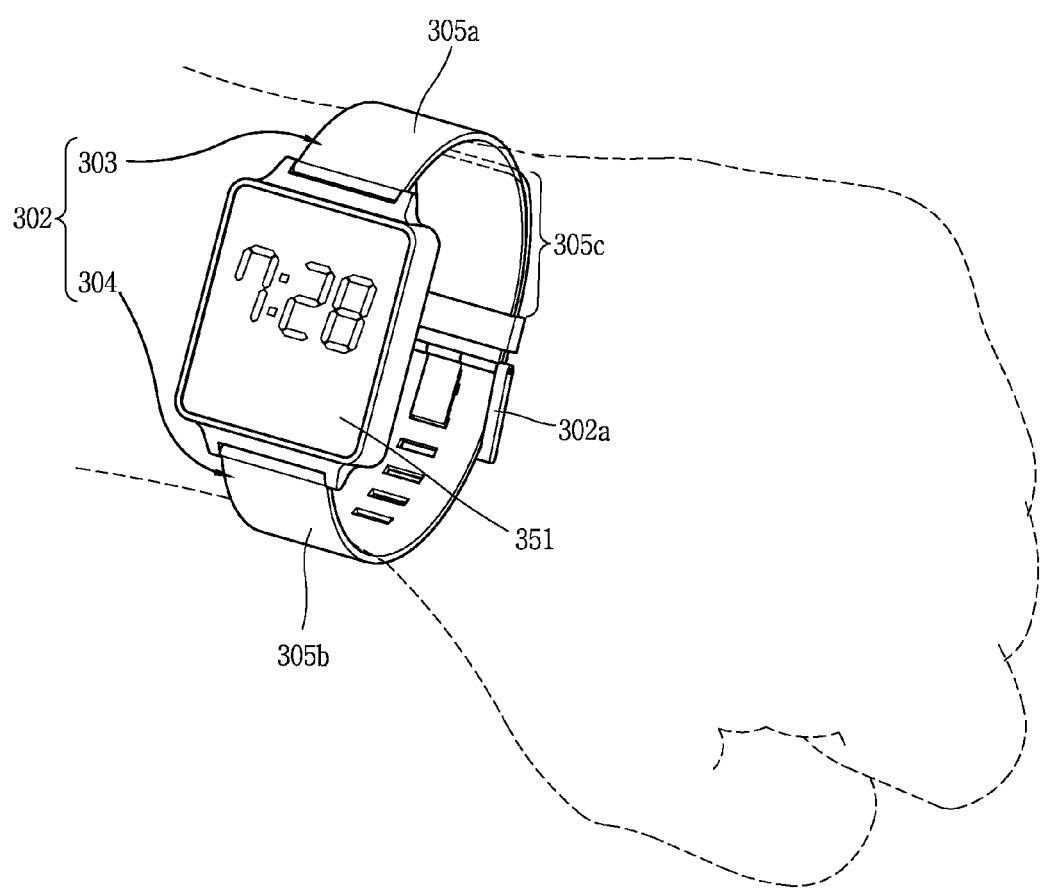
FIG. 4 is a conceptual diagram illustrating a band area applied to the control method illustrated in FIG. 3.

FIG. 3 is a flowchart illustrating a control method according to an exemplary embodiment. FIG. 4 is a conceptual diagram illustrating a band area applied to the control method illustrated in FIG. 3.

Referring to FIG. 3, first, the sensing unit 140 (see FIG. 1A) of the watch type mobile terminal is activated (S310).

The sensing unit 140 is configured to receive a user input applied to the band unit, and activation means that the sensing unit 140 is prepared in a ready state for receiving the user input.

The sensing unit 140 includes one or more sensors for sensing a user input applied to the band unit, and the sensor may be disposed in the band unit.

If the power of the terminal is on even when a sleep mode for allowing most components including the display unit 351 and the like to be non-activated in order to minimize battery consumption, the sensor disposed in the band unit may be activated to always sense the user input. That is, the sensor located in the band unit may be in a continuously activated (always-on) state while the power is being supplied to the controller.

Alternatively, other sensors except the sensor located in the band unit may be non-activated in the sleep mode. In this case, when a user input is sensed by the sensor disposed in the band unit, the other sensors may be activated.

The sensor located in the band unit may be activated only when a user input applied to another portion exists in the state in which the sensor is non-activated. As an example, if the terminal senses touch inputs (e.g., first and second tappings) consecutively applied to the display unit 351 at a time interval, the sensor located in the band unit may be activated. As another example, if a push input is applied to a separate physical key provided in the terminal, the sensor located in the band unit may be activated.

Next, the sensing unit senses a user input applied to the band unit (S320).

In the sensing (S320), the user input may be an input using a predetermined method, which is linked with a function of inputting a control command to the terminal.

For example, the predetermined method may become a touch input or physical input (a push input, a bend input, a flip input, or the like). The sensor located in the band unit may be configured to sense at least the touch input or the physical input, which are applied to the band unit. More specifically, the sensor may be a touch sensor for sensing the touch input or a resonant sensor. Alternatively, the sensor may be a dome switch or piezoelectric sensor for sensing the push input, or may be a bending sensor or whole sensor for sensing the bend input, flip input, or the like. Alternatively, two or more of the touch sensor, the dome switch, the piezoelectric sensor, the bending sensor and the hole sensor may be combined together, so that the sensing unit senses all the touch input, the push input, the bend input, the flip input, and the like.

However, the present invention is not necessarily limited thereto, and the touch input, the push input, the bend input and the flip input may be sensed by at least the proximity sensor 141, the illumination sensor 142, an acceleration sensor, a motion sensor, an RGB sensor, an infrared sensor (IR sensor), a finger scan sensor, an ultrasonic sensor or an optical sensor (e.g., the camera (see 121)).

Referring to FIG. 4, the band unit has a plurality of areas for sensing the user's input. At least one of the sensors described above may be provided in the plurality of areas. In this case, the controller may detect a control command applied to at least one of the plurality of areas, using information sensed in any one of the sensors, or may recognize a control command applied to at least one of the plurality of areas by combining information sensed in two or more sensors.

As described, the band unit 302 includes first and second bands 303 and 304 each connected to one of the sides of the main body, and the plurality of areas are defined by fastening between the first and second bands 303 and 304. The first band 303 is connected to one end (top end) of the main body, and the second band 304 is connected to the other end (bottom end) of the main body. The first and second bands 303 and 304 are fastened to each other by a fastener 302a (see FIG. 2) so that the terminal is worn on a wrist. When the terminal is not worn, the first and second bands 303 and 304 may be separated from each other. However, the present invention is not necessarily limited thereto. Functions described herein may be applied even when the first band is connected to the bottom end and the second band is connected to the top end.

As shown in this FIG. 4, the plurality of areas include a first area 305a, a second area 305b and a third area 305c. The first area 305a may be formed in the first band 303, and the second area 305b may be formed in the second band 304. The third area 305c may be an area in which the first and second bands 303 and 304 are overlapped with each other. More specifically, the first area 305a may be an area except the third area 305 in the first band 303, and the second area 305b may be an area except the third area 305c in the second band 304. The band unit may be formed so that the length of the band unit can be adjusted when the terminal is worn on the wrist.

However, the present invention is not necessarily limited thereto, and the third area may be defined as, for example, an area in which the first and second bands 303 and 304 are connected to each other. For example, the third area may be an area for connecting the first and second bands 303 and 304 so that the first and second bands 303 and 304 are engaged with each other.

A double band unit may be formed by the overlapping or connection of the first and second bands 303 and 304, and the sensing unit may be configured to sense a user input applied to the double band unit.

Hereinafter, the third area illustrates only the area in which the first and second bands 303 and 304 are overlapped with each other. However, in exemplary embodiments described, the third area may be the area in which the first and second bands 303 and 304 are connected to each other (or the area for connecting the first and second bands 303 and 304 so that the first and second bands 303 and 304 are engaged with each other) or the double band unit The sizes of the first, second and third areas 305a, 305b and 305c may be changed by the adjustment of the length. The sizes (or widths) of the first, second and third areas 305a, 305b and 305c may be changed corresponding to the adjustment of the length.

The controller processes the user input applied to the band unit as a control command with respect to the mobile terminal (S330).

The controller may process different control commands based on an area to which a user input is applied among a plurality of areas. The controller may process different control commands, based on which area among the first, second and third areas 305a, 305b and 305c an input (e.g., a short touch) of the same form is sensed in.

The controller may process different control commands, based on which type of input (e.g., a short touch, long touch, drag, bend or flip) is sensed even in the same area. As an example, the user input may be a touch input applied to the band unit, and the controller may process a different control command based on a type of touch input applied to the same area of the band unit. Processing of various types of user inputs and control commands will be described in detail later.

As another example, if first and second tappings (or first and second touches) are consecutively applied to the band unit, the controller may control the terminal to be in a ready state (or an activation state), corresponding to sensing the first tapping. When the second tapping is again applied, the controller may generate a control signal to control the terminal, corresponding to sensing the second tapping and process a corresponding control command. That is, the user first applies the first tapping to transmit information to the terminal, information that the terminal is controlled using the tapping.

The control command may be, for example, a command for activating the display unit 351 or a command performed in the state in which the display unit 351 is activated. In this case, a graphic user interface (GUI) output on the display unit 351 by the user input may be controlled. As a more specific example, graphic images to be selected may be included in the GUI, and any one of the graphic images may be selected by the user input. As another example, a function linked with an execution screen of an application being executed by the user input may be performed, and screen information related to the linked function may be output on the display unit 351. As such, the control of the GUI may exist in several forms, and its detailed exemplary embodiments will be described later.

In the present invention, the control command may be processed in response to the user input even in the state in which the display unit 351 is non-activated. In this case, a wake-up signal may exist so that a touch with respect to the band unit is received as the user input. As an example, the wake-up signal may be generated by a user input applied to another portion in a state in which the sensor located in the band unit is non-activated, or may be generated by the initial tapping (the first tapping of the first and second tappings) among the tappings consecutively applied to the band unit. As another example, the wake-up signal may be generated by a control command applied through a voice or a control command applied through movement of the terminal. In this case, operation control for the terminal may be performed corresponding to a user input sensed after the wake-up signal is applied.

As described, an input in the present invention is applied to the watch type mobile terminal using the band unit in order to provide increased user convenience. Further, as the band unit is divided into a plurality of areas, various forms of control methods can be implemented.

Hereinafter, the control methods will be described in detail through exemplary embodiments with reference to the accompanying drawings. A method for inputting a control command through the band unit may be variously implemented. Thus, in the present invention, a method for controlling the watch type mobile terminal using the band unit will be described through representative examples of various exemplary embodiments.

Figure 5A:
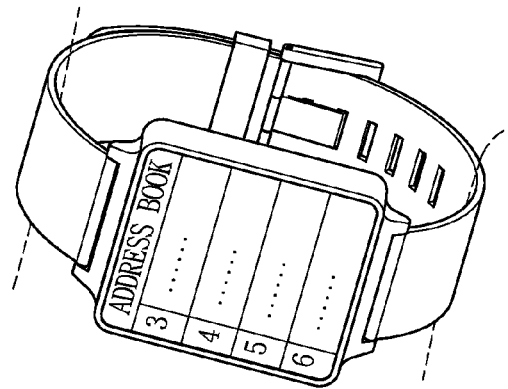
FIGS. 5A(a), 5A(b), 5A(c), 5B(a), 5B(b) and 5B(c) are conceptual diagrams illustrating a method for controlling a function being performed.
Figure 5A:
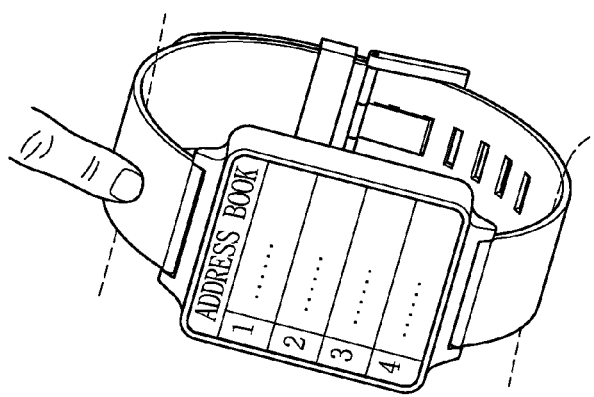
Figure 5A:
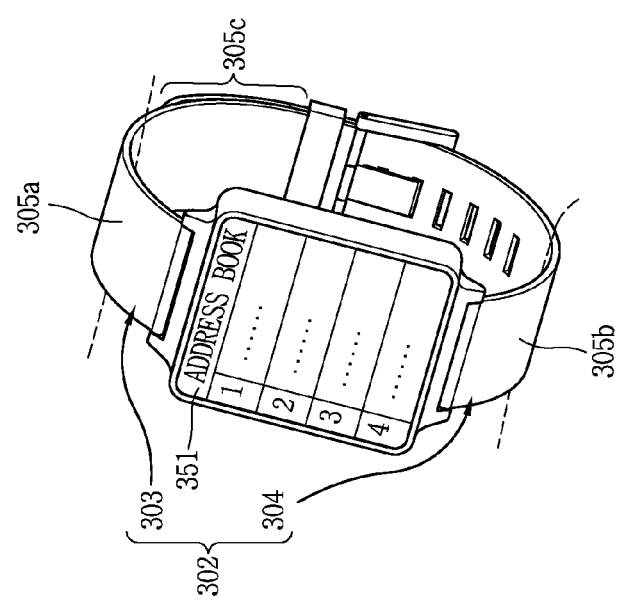

First, an exemplary embodiment of controlling a function being performed based on a user input applied to the band unit will be described in detail with reference to the accompanying drawings. FIGS. 5A (a)-(c) and 5B (a)-(c) are conceptual diagrams illustrating a method for controlling a function (or specific application) being performed.

Referring to FIG. 5A (a), an execution screen of a specific function may be output on the display unit 351. In this case, the specific function may be a function performed by execution of a specific application or specific mode. For example, the specific function may be a function using an address book (e.g., partner search or selection for call connection), and the specific application may be an address book application. As shown in FIG. 5A (a), as the address application is executed, a previously stored address list may be output on the display unit 351. In the state in which the execution screen of the specific function is output on the display unit 351 as described above, the band unit 302 may be in an activated state.

Referring to FIG. 5A (b), if a touch input is applied to the band unit 302 by the user, the sensing unit 140 senses the touch input. In this case, the sensing unit 140 includes a touch sensor provided in the band unit 302. As another example, a touch input may be applied to the band unit 302 by a pen unit. In this case, the sensing unit 140 may have a touch sensor to sense a touch of the pen unit, or may have a resonant circuit to detect a position of the pen unit through a change in magnetic field.

Referring to FIGS. 5A (b) and (c), if a touch input is applied to the band unit 302, the address book list may be scrolled. That is, a function linked with the currently executed application (or specific function) may be performed by the touch input applied to the band unit 302. The scrolling may be performed when a touch input applied to any one of the first, second and third areas 305a, 305b and 305c is maintained. For example, the scrolling may be maintained while contact is being maintained after a short touch is applied to the first area 305a. If the contact is released, the scrolling may be stopped. The scrolling may be displayed while moving the address book list from the top to the bottom or moving the address book list from the bottom to the top. Top may mean a side close to the inside of the wrist in a state in which the watch type mobile terminal is worn on the wrist.

However, the present invention is not limited thereto. For example, if a touch input is applied to the first area 305a, the address book list may be scrolled from the bottom to the top. If a touch input is applied to the second area 305b, the address book list may be scrolled from the top to the bottom.

The function linked with the currently executed application when the touch input is applied to the band unit 302 may be performed by a touch input with respect to a specific area among the plurality of areas. For example, referring to FIGS. 5B (a)-(c), as the address book application is executed, the previously stored address book list is output on the display unit 351 (see FIG. 5B (a)). If the user applies a touch input to the third area 305c (see FIG. 5B (b)), the address book list may be scrolled (see FIG. 5B (c)). The first and second areas may become areas in which any sensor for sensing a user input does not exist, or may be in a state in which the sensor is provided but non-activated. In relation to the direction of the scrolling, if the user applies a drag to the third area 305c, the address book list may be scrolled along the direction of the drag. In this case, if the drag is stopped, the scrolling may be stopped.

Next, a method for processing several control commands using the band unit will be described in detail with reference to FIGS. 6A (a-d) to 6C (a-c).

As an example, the function executed by the user input applied to the band unit may include a function linked with the currently executed application described with reference to FIGS. 5A (a)-(c) and 5B (a)-(c), or a function related to a current operation of the terminal. As another example, the user input may cause execution of a specific function specified to at least a sensed area of a type of the input. Different functions may be performed based on the area and type. For example, a touch input applied to the band unit 302 may be a short touch, long touch, tapping, drag, swipe or the like, and a physical input may be an input accompanied with bend (or movement) of the band unit.

Hereinafter, several user inputs applied to the band unit to perform functions will be described. At least one of the previously described functions may be performed in response to several user inputs. Only some of the several user inputs may be applied in the terminal, and the others may not be applied in the terminal. In addition, different controls may be performed with respect to some user inputs applied. For example, the control method described with reference to FIGS. 5A (a)-(c) and 5B (a)-(c) may be performed by any user input described below.

Figure 6A:
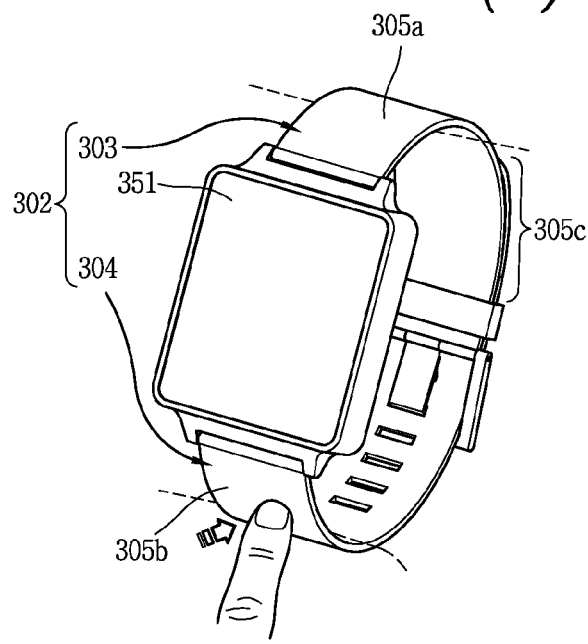
FIGS. 6A(a), 6A(b), 6A(c) and 6A(d) area conceptual diagrams illustrating a method for processing several control commands defined based on a type of touch input.
Figure 6A:
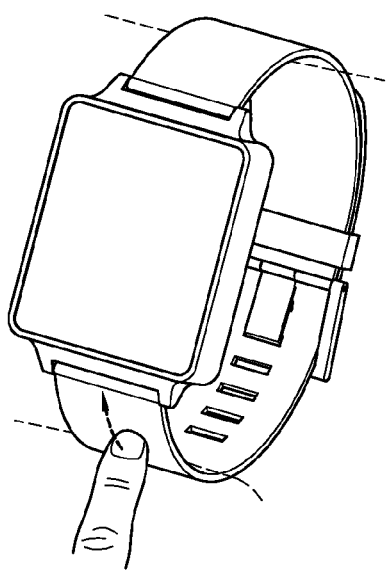
Figure 6A:
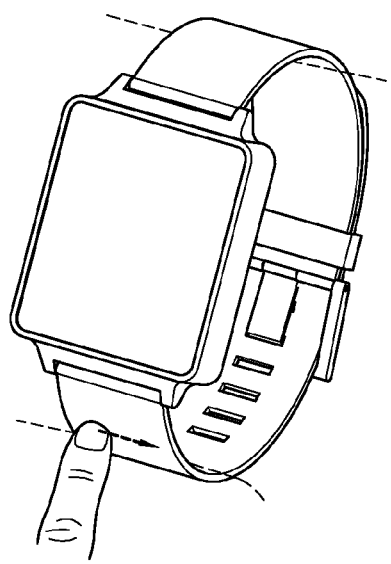
Figure 6A:
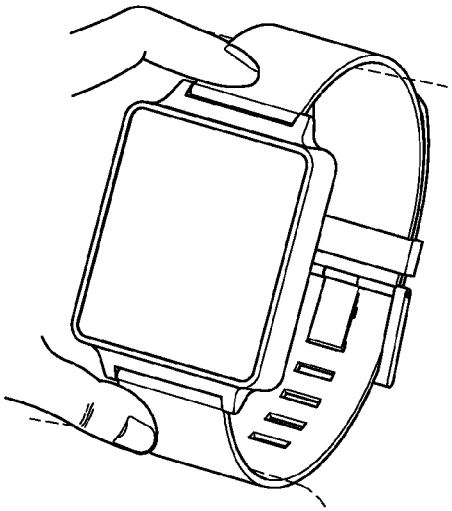

FIGS. 6A (a)-(d) area conceptual diagrams illustrating a method for processing several control commands defined based on a type of a touch input.

Referring to FIG. 6A (a), a touch input sensed in the band unit 302 may be a short touch, a tapping or a long touch applied for a predetermined time or more. The short touch, tapping, long touch and the like may be sensed in at least one of the first or second bands 303 and 304.

As another example, referring to FIG. 6A (b), a touch input sensed in the band unit may be a drag applied along one direction. The touch input may be sensed as a drag applied along the length direction of the band unit in at least the first or second bands 303 and 304. More specifically, at least one of the previously described functions may be performed by a drag applied from the top to the bottom or from the bottom to the top in at least the first or second bands 303 and 304.

As still another example, referring to FIG. 6A (c), the drag may be sensed as a drag applied along the width direction (direction perpendicular to the length direction) of the band unit in at least the first or second bands 303 and 304. More specifically, at least one of the previously described functions may be performed by a drag applied from the left to the right or from the right to the left.

As still another example, referring to FIG. 6A (d), at least one of the previously described functions may be performed by a touch input simultaneously applied to two areas among a plurality of areas of the band unit 302. Specifically, the touch input sensed in the band unit 302 may be a short touch, a tapping or a long touch applied for a predetermined time or more, which is simultaneously applied to the first and second areas 305a and 305b (or simultaneously applied to the first and second bands 303 and 304). The touch input sensed in the band unit 302 may be a drag simultaneously applied to the first and second bands 303 and 304.

Figure 6B:
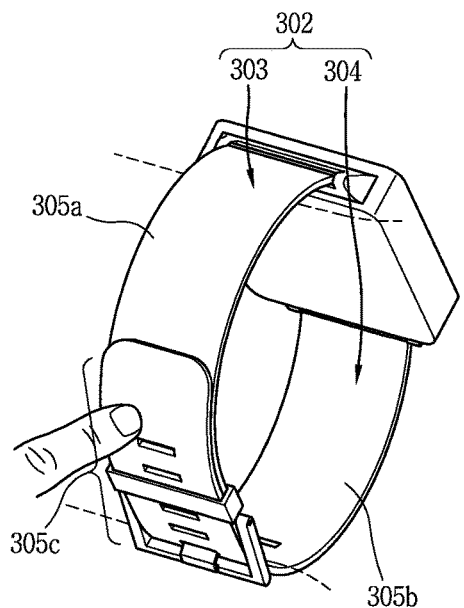
FIGS. 6B(a), 6B(b), 6B(c) and 6B(d) are conceptual diagrams illustrating a method for processing several control commands using a third area.
Figure 6B:
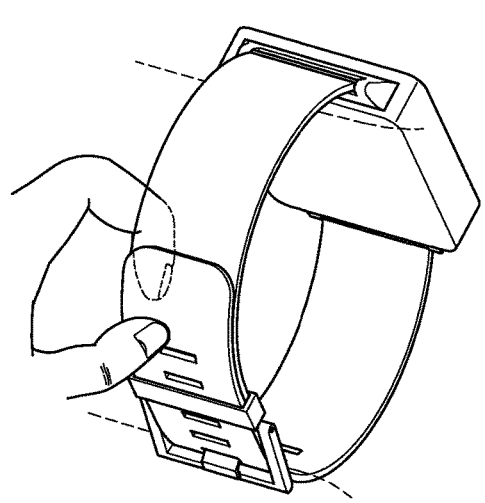
Figure 6B:
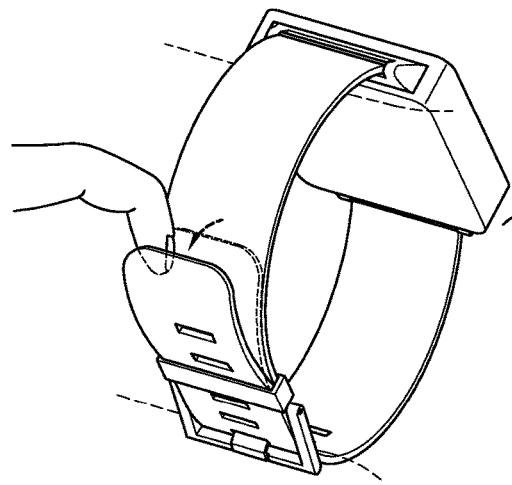
Figure 6B:
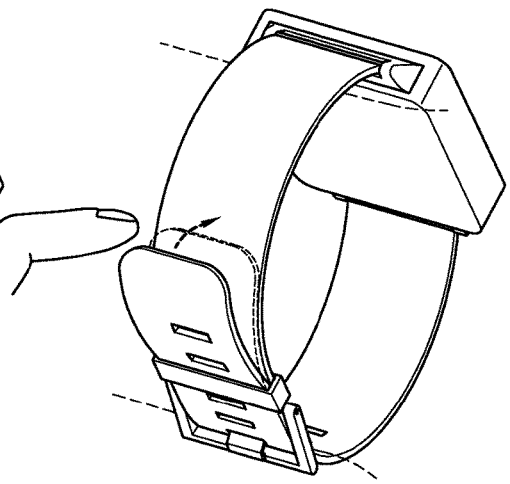

FIGS. 6B (a)-(d) are a conceptual diagrams illustrating a method for processing several control commands using a third area.

Referring to FIG. 6B (a)-(d), a user input applied to the third area 305c by the user may be, for example, a touch input or physical input, and at least one of the previously described functions may be performed in response to the user input.

As an example, referring to FIG. 6B (a), the touch input sensed in the third area 305c may be a short touch, a tapping or a long touch applied for a predetermined time or more. In addition, a drag, swipe or the like applied to the third area 305c may be the touch input. More specifically, the short touch, tapping, long touch, drag, swipe and the like may be sensed at a portion corresponding to the third area 305c in the first and second bands 303 and 304. As shown in FIG. 6B (a), if any of the short touch, tapping, long touch, drag or swipe is applied to the outer surface (surface opposite to the surface facing the wrist when the watch type mobile terminal is worn on the wrist) of the second band 304 when the second band 304 covers the first band 303 in the third area 305c, the controller may process this as a user input.

As another example, referring to FIG. 6B (b), at least one of the previously described functions may be performed by a touch input sensed from both surfaces of the band unit in the third area 305c. More specifically, if any of the short touch, tapping, long touch, drag or swipe is applied to the outer surface of the second band 304 and the inner surface (surface facing the wrist when the watch type mobile terminal is worn on the wrist) of the first band 303 when the second band 304 covers the first band 303 in the third area 305c, the controller may process this as a user input.

As still another example, at least one of the previously described functions may be performed by a physical input sensed from the band unit in the third area 305c.

Referring to FIG. 6B (c), if any one of the first and second bands 303 and 304 is lifted in the third area 305c, the controller may process this as a user input. FIG. 6B (c), it is illustrated that one end of the second band 304 is lifted by the lifting operation. The sensing unit may sense that the second band moves relative to the first band, or may sense that a bend occurs in the second band. Accordingly, the sensing unit can recognize that the second band 304 is lifted.

Referring to FIG. 6B (d), if any of the first or second bands 303 and 304 is flipped in the third area 305c, the controller may process this as a user input (specifically, a flip input). FIG. 6B (d), it is illustrated that one end of the second band 304 is flipped. To this end, if the force for lifting the one end of the second band is removed, the second band may be restored to the original position by the self-elasticity thereof.

However, the present invention may be applied even when the first band 303 covers the second band 304 in the third area 305c. In this state, the outer surface of the first band 303 may be an object of the touch input in FIG. 6B (a), and the inner surface of the second band 304 and the outer surface of the first band 303 may become objects of the touch input in FIG. 6B (b). In FIGS. 6B (c) and (d), the first band 303 may become an object of the physical input.

Figure 6C:
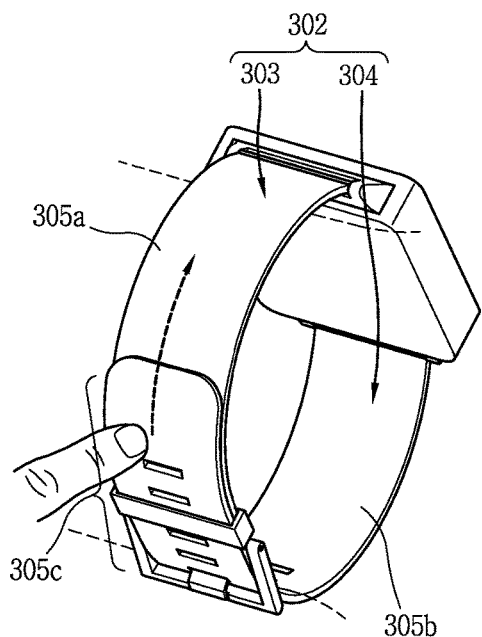
FIGS. 6C(a), 6C(b), and 6C(c) are a conceptual diagrams illustrating a method for processing several control commands using a boundary portion between a plurality of areas.
Figure 6C:
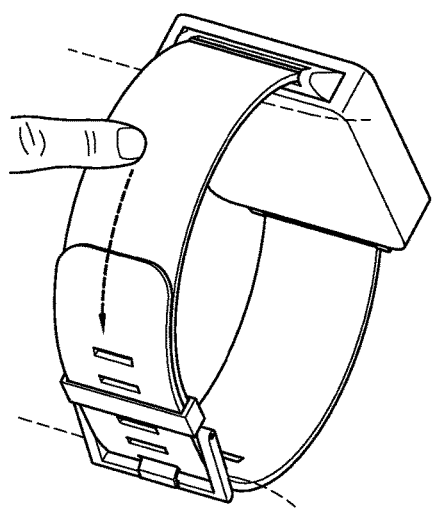
Figure 6C:
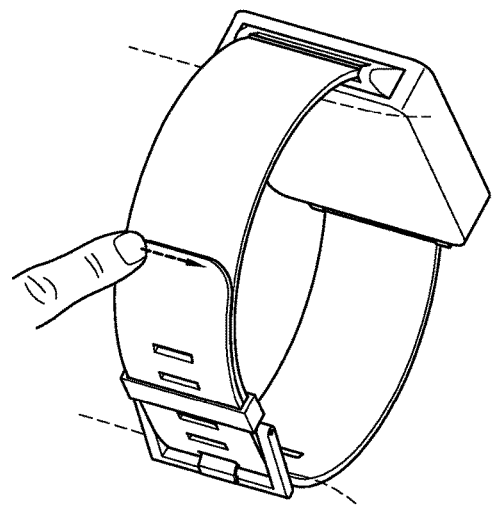

FIGS. 6C (a)-(c) are a conceptual diagrams illustrating a method for processing several control commands using boundary portions between a plurality of areas.

Referring to FIGS. 6C (a)-(c), at least one of the previously described functions may be performed in response to a touch input applied to a boundary portion of the third area 305c.

As an example, referring to FIGS. 6C (a) and (b), after the band unit is touched, the controller may process, as a user input, a drag or swipe passing through the boundary portion of the third area 305c. The sensing unit may sense a direction of the drag or swipe, and different controls (first and second controls) may be performed based on the direction. As shown in FIG. 6C (a), the first control may be performed by a drag or swipe that starts from the third area 305c of the second band 304, passes through the boundary portion and then reaches the first area 305a of the first band 303. On the contrary, as shown in FIG. 6C (b), the second control may be performed by a drag or swipe that starts from the first area 305a of the first band 303, passes through the boundary portion and then reaches the third area 305c.

As another example, referring to FIG. 6C (c), the controller may process, as a user input, a drag or swipe that is applied to the boundary portion and progresses along the boundary line. If a drag or swipe is applied along the width direction of the band unit, at least one of the previously described functions may be performed.

Next, a method for processing several control command using a portion adjacent to a third area will be described in detail with reference to FIGS. 7 (a) and (b). FIGS. 7 (a) and (b) are conceptual diagrams illustrating a method for processing several control commands using a portion adjacent to the third area.

Figure 7A:
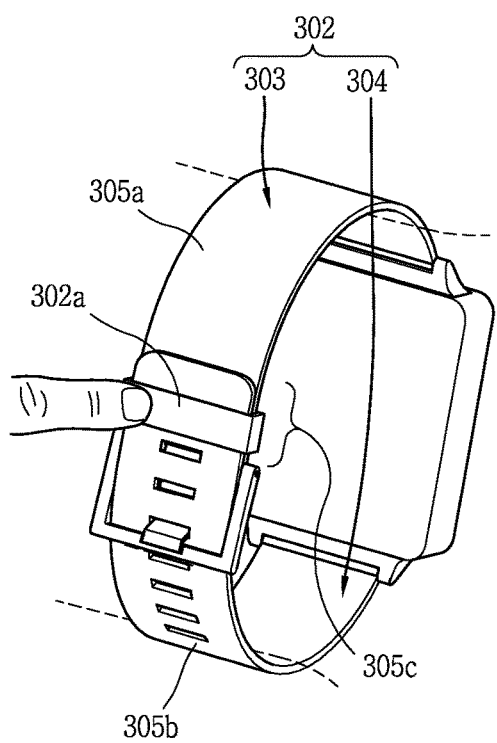
FIGS. 7(a) and 7(b) are conceptual diagrams illustrating a method for processing several control commands using a portion adjacent to a third area.
Figure 7B:
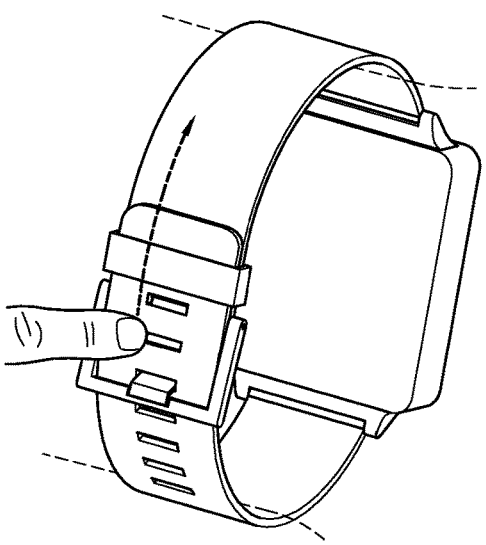

Referring to FIGS. 7 (a) and (b), the length of the band unit 302 may be adjusted when the watch type mobile terminal is worn on the wrist, and the sizes of the first, second and third areas 305a, 305b and 305c may be changed by the length adjustment. If the size of the third area 305c is smaller than a predetermined value, the third area 305c may include another portion in addition to the portion at which the first and second bands 303 and 304 are overlapped with each other. Accordingly, the user can easily input a control command when the size of the third area 305c is small. The predetermined value is a reference value, and therefore, the portion at which a user input is sensed may be changed depending on the size of the third area 305c. However, the present invention is not necessarily limited thereto, and the example illustrated with reference to FIGS. 7(a) and (b) may be applied to the present invention regardless of the size of the third area 305c.

As an example, referring to FIG. 7 (a), a user input with respect to the fastener 302a provided to the band unit 302 may also be processed like the input applied to the third area 305c. The sensing unit may sense a touch, push, bend, flip or the like with respect to the fastener 302a, and the controller may perform at least one of the previously described functions in response to the sensing.

As another example, a user input applied to one band covered by another band may also be processed like the input applied to the third area 305c. The sensing unit may sense a touch, push, bend, flip or the like with respect to a portion adjacent to the fastener 302a in the first band 303, and the controller may perform at least one of the previously described functions in response to the sensing.

Referring to FIG. 7 (b), a continuous touch input in the first and second bands 303 and 304 may also be processed like the input applied to the third area 305c. If one band covering another band (the second band in this example) or the fastener is touched and the band covered by the other band (the first band in this example) is then touched, the controller may perform at least one of the previously described functions in response to the continuous touch.

In this example, when the third area is an area connecting the first and second bands to be engaged with each other, the continuous touch input may be a touch applied to the same plane formed by the first band, the third area and the second band. The continuous touch input may be a touch applied to a boundary portion at which the first and second bands are engaged with each other. In this case, the touch may be a drag or swipe.

Next, specific exemplary embodiments in which the previously described functions are performed using a third area will be described in detail with reference to FIGS. 8A (a)-(c) to 8C (a) and (b). FIGS. 8A (a)-(c) to 8C (a) and (b) are conceptual diagrams illustrating exemplary embodiments using a third area.

Referring to FIGS. 8A (a)-(c) to 8C (a) and (b), if a user input is applied to the band unit, the controller may execute a predetermined operation mode. For example, if a user input with respect to the third area 305*c* is sensed, the controller may perform a specific function. The user input with respect to the third area 305*c* may be linked with the specific function. As an example, a specific application or specific mode may be executed, and an exercise mode (or health mode) is illustrated in the exemplary embodiment.

If a user input of any of touch, push, bend or flip is sensed in a state in which an execution screen of a watch function is output on the display unit 351 as shown in FIG. 8A (a), the controller executes an exercise mode in the terminal as shown in FIG. 8A (b). An execution screen of the exercise mode may be output on the display unit 351 while the exercise mode is being executed. However, the execution of the operation mode may be performed regardless of whether the display unit 351 is activated. Specifically, the display unit 351 may be non-activated before the exercise mode is executed.

The controller may control a function performed in the operation mode using an additional user input applied to the band unit. As an example, if an additional user input is applied in the exercise mode, a specific function of recording exercise information, or the like may be performed as shown in FIG. 8A (c). Although not shown, when it is unnecessary to display the exercise mode, the execution screen of the exercise mode may not be displayed. The display unit 351 may be non-activated. As another example, the exercise information may be provided to the user through voice or vibration.

The additional user input, as shown in FIG. 8A (b), may be a touch input applied to the third area 305*c*. However, the present invention is not necessarily limited thereto, and the additional user input may be applied in various manners. For example, the additional user input may be applied through a touch with respect to the first or second area 305*a* or 305*b*, a voice, or a separately provided physical key.

As another example, if a touch input with respect to the third area 305*c* is sensed while a specific function of recording exercise information, or the like is being performed as shown in FIG. 8B (a), the controller performs control related to the specific function. For example, as shown in FIG. 8B (b), the specific function may be paused. That is, the function of recording the exercise information may be paused. In this state, if a touch input is again applied to the third area 305*c*, the pause may be released, and the function of recording the exercise information may be again performed.

Figure 8C:
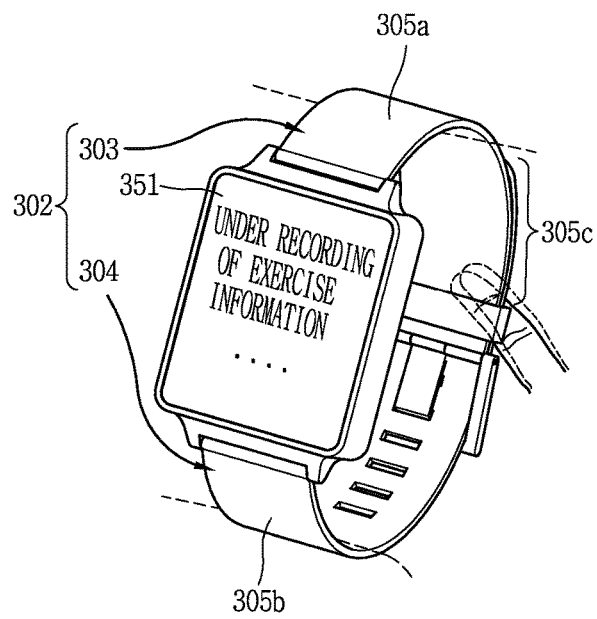
FIGS. 8A(a), 8A(b), 8A(c), 8B(a), 8B(b), 8C(a) and 8C(b) are conceptual diagrams illustrating exemplary embodiments using a third area.
Figure 8C:
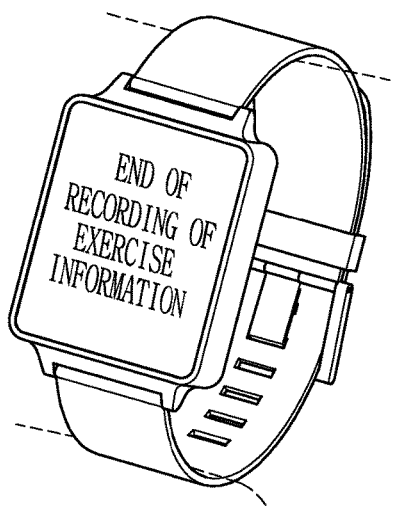

As still another example, if another type of touch input with respect to the third area 305*c* is sensed while a specific function of recording exercise information, or the like is being performed as shown in FIG. 8C (a), the controller may perform another control related to the specific function. For example, as shown in FIG. 8C (b), the specific function may be ended. In this case, the touch input may be a tapping (double tapping or first and second tappings) or touch (double touch or first and second touches) consecutively applied at a time interval.

As described with reference to FIGS. 8B (a) and (b) and 8C (a) and (b), the controller can process different control commands based on a kind of a touch input applied to the same area of the band unit. Accordingly, it is possible to perform various controls (execution, pause, end and the like) using the type of the touch input.

Next, functions performable based on a type of a touch input will be described in detail with reference to the accompanying drawings. FIGS. 9A (a) and (b) to 9C (a) and (b) are conceptual diagrams illustrating a method for controlling a function based on a type of a touch input.

Referring to FIG. 9A (a), if a touch input is applied to the third area 305*c*, an exercise mode is executed. As the exercise mode is executed, an operation of recording exercise information or the like may be performed. However, before the exercise mode is executed, another mode may be executed, or a sleep mode in which the display unit 351 is non-activated may be executed as described above. Subsequently, if a user's finger simultaneously surrounds another area together with the third area 305*c*, another mode may be executed. More specifically, if a long touch is applied to the third area 305*c*, the exercise mode may be executed. If a touch covering at least one portion of the third and first areas 305*c* and 305*a* is applied, a blood pressure check mode for measuring a user's blood pressure may be executed.

The blood pressure check mode, as shown in FIG. 9B (a), may be executed by a touch simultaneously covering another area together with the third area 305*c* in the watch or sleep mode, rather than the exercise mode.

The user input applied to the band unit may be any of a plurality of touch inputs applied to the band unit, and each of the plurality of touch inputs may be defined as an execution command with respect to any one of a plurality of operation modes.

Further, the blood pressure check mode is executed by the touch in the state in which the display unit 351 is non-activated. The display unit 351 may continuously maintain the non-activated state. The operation may be applied to the execution of the exercise mode. As shown in FIGS. 9A (a) and (b) and 9B (a)-(c), the function related to health may be executed while maintaining the non-activated state of the display unit 351.

If the blood pressure check mode is executed, blood pressure measurement is performed as shown in FIG. 9B (b). If the blood pressure measurement is completed, a feedback may be output as shown in FIG. 9B (c). As an example of the feedback, vibration may be generated in the main body, or sound notification or the like may be output. The feedback may be generated even in a situation where the blood pressure check mode is not performed anymore. For example, the feedback may be generated when the band unit is loosened or when the main body or band unit is not contacted with the wrist.

Figure 9C:
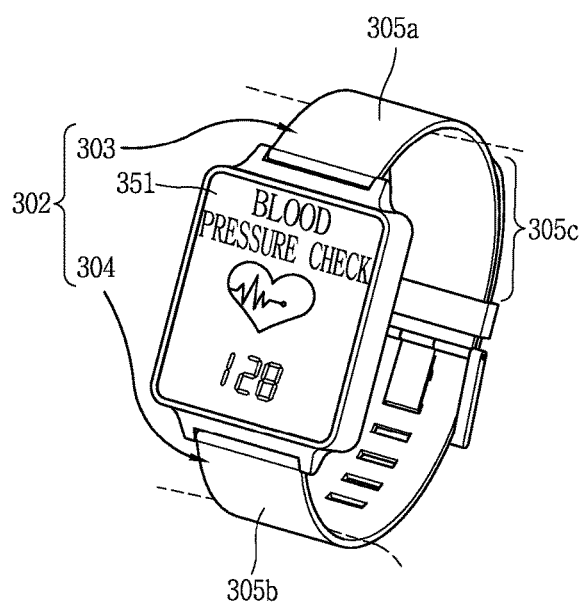
FIGS. 9A(a), 9A(b), 9B(a), 9B(b), 8C(c), 9C(a) and 9C(b) are conceptual diagrams illustrating a method for controlling a function based on a type of touch input.
Figure 9C:
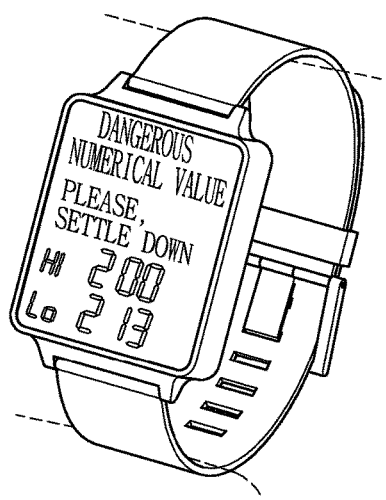

If the blood pressure check mode is executed, blood pressure measurement is performed as shown in FIG. 9C (a). If the blood pressure measurement is completed, a result value may be output on the display unit 351 as shown in FIG. 9C (b). The blood pressure measurement may be performed in the state in which the display unit 351 is non-activated. If the blood pressure measurement is completed, the result value may be output while the display unit 351 is being activated. As another example, a progress bar for notifying a procedure in which the blood pressure measurement is performed may be displayed on the display unit 351. If the blood pressure measurement is completed, a result value may be output.

The output of the result value may be performed only when the blood pressure is out of a predetermined range. That is, when the blood pressure is not a normal numerical value, the result value may be output while the display unit 351 is being activated in order to notify that the blood pressure is abnormal.

As another example, the result value may be always output, and a separate feedback may be provided when the blood pressure is not the normal numerical value as the measurement result. As a specific example, the controller may output sound notification, or may control the band unit to repeatedly tighten the wrist. The tightening feeling may be provided by an electric active polymer material contained in the band unit when the supply of power to the electric active polymer material is controlled.

When the measured blood pressure is a dangerous numerical value, a result value may be output while the display unit 351 is being activated. In addition, treatment guidance information may be displayed in which methods for recovering the blood pressure are listed.

Other exemplary embodiments in which a screen or function is controlled using a plurality of areas will be described in detail with reference to the accompanying drawings. FIGS. 10A (a)-(c) to 10C (a) and (b) are conceptual diagrams illustrating a method for controlling a reproduction application using the band unit.

Referring to FIG. 10A (a), a music application is executed as an example of a reproduction application, and music reproduction control icons (e.g., fast-forward, pause/replay, rewind and the like) may be output on the display unit 351. If a touch input is applied to the third area 305c, control related to the reproduction of music may be performed. More specifically, if the third area 305c is touched in a state in which music is reproduced, the reproduction of the music may be stopped as shown in FIG. 10A (b). If the third area 305c is again touched, the production of music, which has been stopped, may be again performed as shown in FIG. 10A (c).

As another example, if the third area 305c is touched in a state in which a specific content is reproduced, a thumbnail for each time zone of the corresponding content may be displayed on the display unit 351.

However, the execution of the reproduction application or the performance of the control may be made while the display unit is maintaining the non-activated state. According to the exemplary embodiment, control including fast-forward, pause, rewind, previous, next, stop, replay and the like is possible even though the user does not turn on a screen in the state in which content is reproduced. In addition, the execution of the reproduction application or the performance of the control may be made in a state in which time is output on the display unit. In the following exemplary embodiment, the display unit may be in the state in which the display unit is non-activated or in the state in which the time is output on the display unit.

Figure 10B:
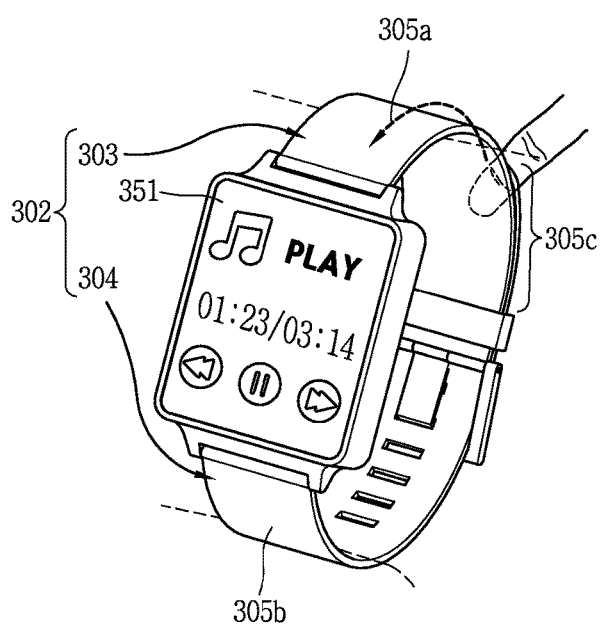
FIGS. 10A(a), 10A(b), 10A(c), 10B(a), 10B(b), 10C(a) and 10C(b) are conceptual diagrams illustrating a method for controlling a reproduction application using a band unit.
Figure 10B:
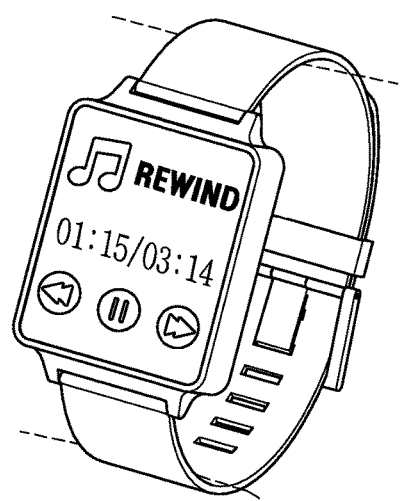

Referring to FIGS. 10B (a) and (b) and 10C (a) and (b), control related to the reproduction of a content may be performed by a drag or swipe applied to the band unit. As an example, referring to FIG. 10B (a), if the sensing unit senses a drag or swipe continued from the third area 305c to the first area 305a in a state in which a content is reproduced, the controller performs rewinding of the reproduced content. The rewinding may be performed while the drag or swipe is being applied. As shown in FIG. 10B (b), if a user's finger that has applied the drag or swipe is separated from the band unit 302 in the first area 305a, the reproduction is again performed. However, the present invention is not necessarily limited thereto. If the drag or swipe is stopped even though the user's finger is not separated from the band unit 302, the reproduction may be performed.

Figure 10C:
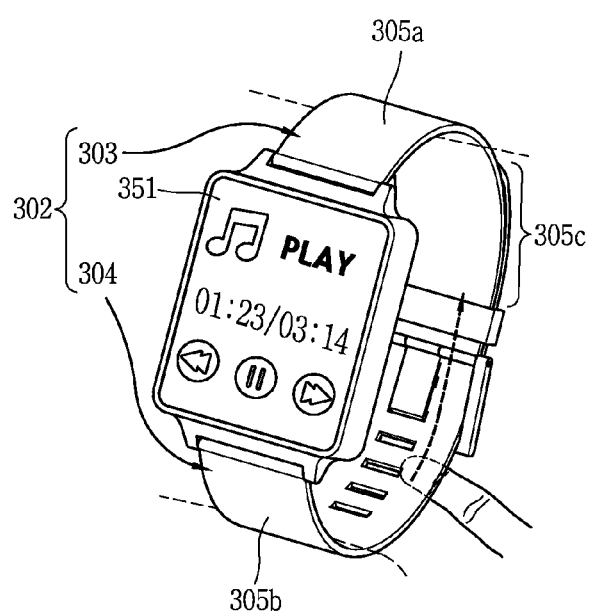
Figure 10C:
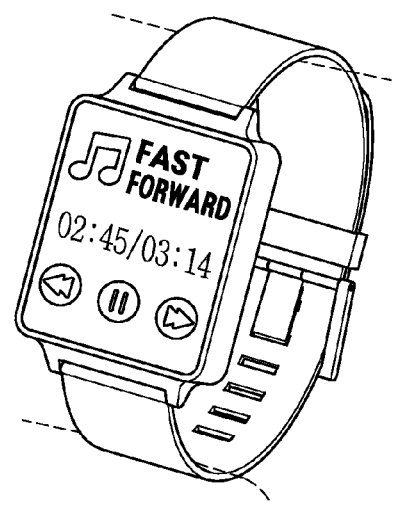

As another example, referring to FIG. 10C (a), if the sensing unit senses a drag or swipe continued from the second area 305b to the third area 305c in a state in which a content is reproduced, the controller performs fast forwarding of the reproduced content. Different controls related to the reproduction of the content may be performed based on an area to which the drag or swipe is applied in the band unit 302. As shown in FIG. 10C (b), if a user's finger that has applied the drag or swipe is separated from the band unit 302 in the third area 305c, the reproduction is again performed. However, the present invention is not necessarily limited thereto. If the drag or swipe is stopped even though the user's finger is not separated from the band unit 302, the reproduction may be performed.

Figure 11A:
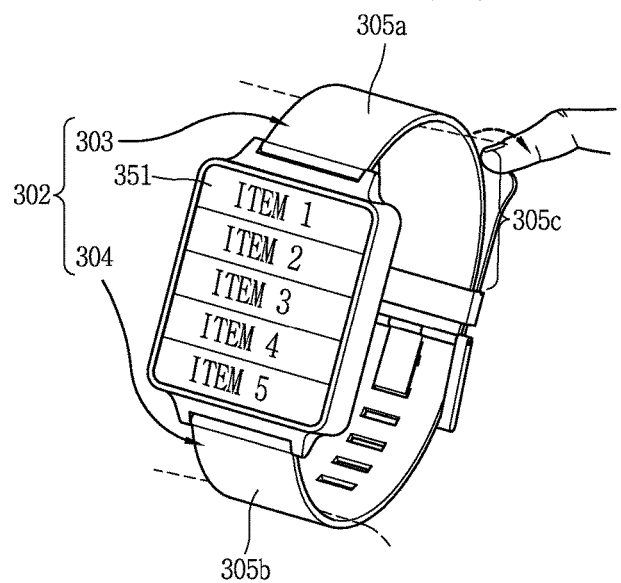
FIGS. 11A(a), 11A(b), 11A(c), 11A(d), 11B(a), 11B(b) and 11B(c) are conceptual diagrams illustrating a method for controlling screen information using a band unit.
Figure 11A:
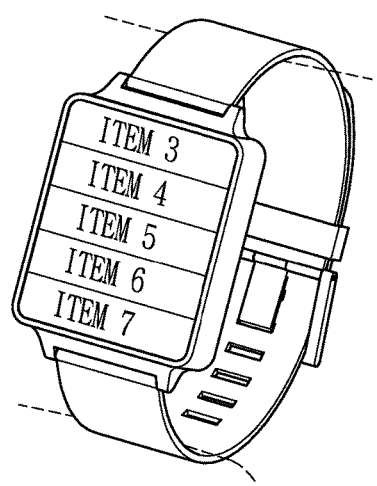
Figure 11A:
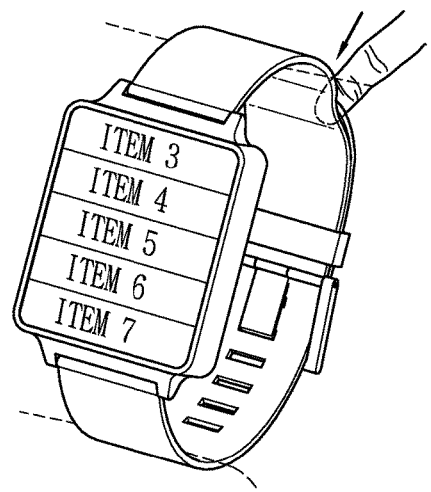
Figure 11A:
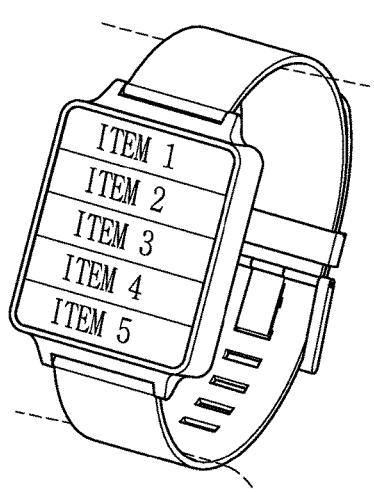
Figure 12A:
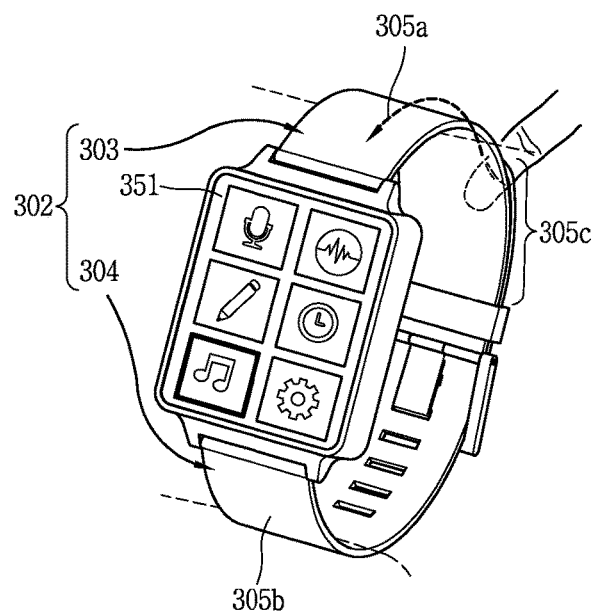
FIGS. 12A(a), 12A(b), 12B(a), 12B(b), 12C(a), 12C(b), 12D(a) and 12D(b) are conceptual diagrams illustrating a method for performing control related to an indicator using a band unit.
Figure 12A:
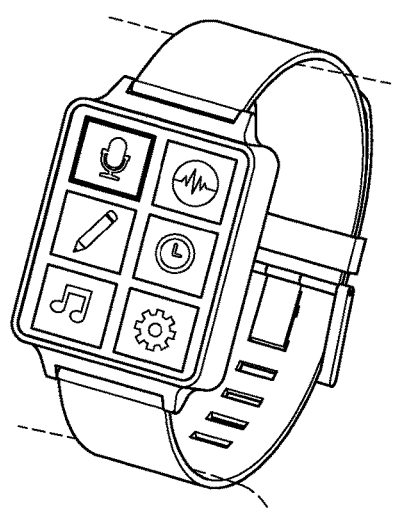

Exemplary embodiments in which control related to the display unit is performed using a user input applied to the band unit will be described in detail with reference to the accompanying drawings. FIGS. 11A (a)-(d) and 11B (a)-(c) are conceptual diagrams illustrating a method for controlling screen information using the band unit. FIGS. 12A (a) and (b) to 12D (a) and (b) are conceptual diagrams illustrating a method for performing control related to an indicator using the band unit.

Referring to FIGS. 12A (a) and (b) to 12D (a) and (b), the controller processes a user input applied to the band unit as a control command with respect to the mobile terminal. The control related to the display unit is performed by the control command. If the user input is applied to the band unit in a state in which screen information of the display unit is output, at least one portion of the screen information may be changed.

First, referring to FIGS. 11A (a)-(d), a list having a plurality of items may be output as an execution screen of a specific function on the display unit 351. In the state in which the list of the specific function is output on the display unit 351, the band unit may be in an activated state. In this state, if one end of one band (the second band in the exemplary example) covering another band, which is a boundary portion of the third area 305c, is pulled and lifted as shown in FIG. 11A (a), the list may be scrolled toward the top as shown in FIG. 11A (b).

If one end of the second band 304, which is a boundary portion of the third area, is pressed to move in the direction facing the wrist as shown in FIG. 11 (c), the list may be scrolled toward the bottom as shown in FIG. 11A (d). However, the directions of the scrolling may be applied opposite to each other.

If a drag or the like for scrolling is applied to the display unit 351, the list is not properly viewed. In the present invention, this problem is solved using the band unit. The moving speed of the list may be changed depending on the intensity and speed of a force pulling and pressing the band unit. As the moving speed of the list is changed, the number of items newly displayed on the display unit 351 may be changed by the scrolling even through an input is applied at the same time.

Referring to FIG. 11B (a), a menu having a plurality of menu items may be output as an execution screen of a specific function on the display unit 351. In this state, if the user selects any one of the menu items, an execution screen corresponding to the selected one may be output on the display unit 351 as shown in FIG. 11B (b).

As shown in FIG. 11B (c), if a drag or swipe moving toward the first area 305*a* from the third area 305*c* or toward the third area 305*c* from the first area 305*a* is applied to the band unit, the function of a back button is performed. That is, the menu that is a previous screen may be output on the display unit 351 by the drag or swipe.

As another example, referring to FIGS. 12A (a) and (b) to 12D (a) and (b), if a user input is applied to the band unit in a state in which an indicator for indicating an object to be selected is included in screen information, the position of the indicator may be moved in response to the user input.

Referring to FIGS. 12A (a) and (b) to 12C (a) and (b), the user input applied to the band unit is defined to perform the function of a direction key, and accordingly, the position of the indicator is moved. For example, graphic images that become objects to be selected are displayed on the display unit 351, and the indicator indicates any one of the graphic images. If a drag or swipe is applied to the band unit 302, the indicator is moved by sequentially indicating the graphic images.

Figure 12B:
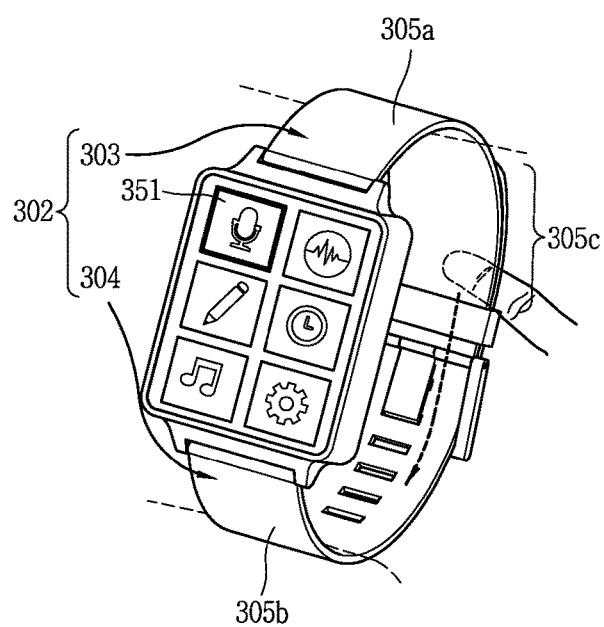
Figure 12B:
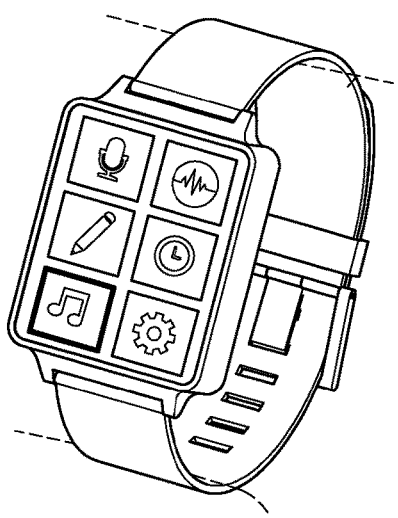

As an example, referring to FIGS. 12A (a) and (b), the indicator may be moved from a graphic image at the bottom to a graphic image at the top by a drag or swipe moving toward the first area 305*a* from the third area 305*c*. As another example, referring to FIGS. 12B (a) and (b), the indicator may be moved from the graphic image at the top to the graphic image at the bottom by a drag or swipe moving toward the second area 305*b* from the third area 305*c*.

As still another example, referring to FIGS. 12C (a) and (b), the indicator may be moved to the left/right by a drag or swipe moving along a boundary line of the third area 305*c*. The moving direction of the indicator may be determined based on a direction of the drag or swipe. Specifically, as shown in FIG. 12C (b), if the drag or swipe is applied from the left to the right, the indicator may be moved from a graphic image at the left to a graphic image at the right. Although not shown, if the drag or swipe is applied from the right to the left, the indicator may be moved from the graphic image at the right to the graphic image at the left.

Figure 12D:
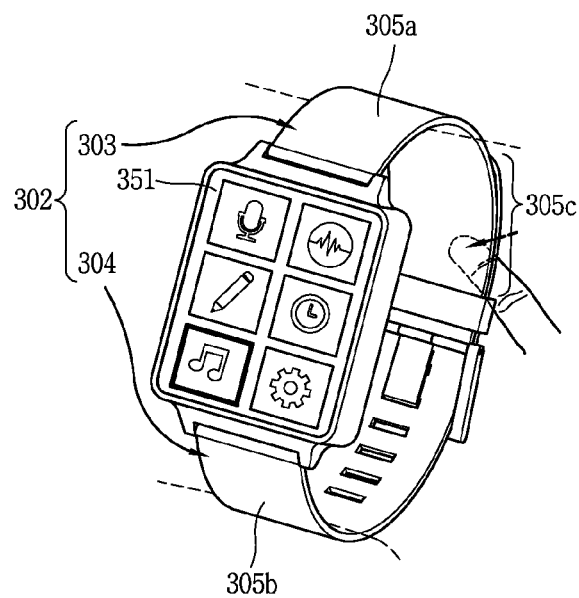
Figure 12D:
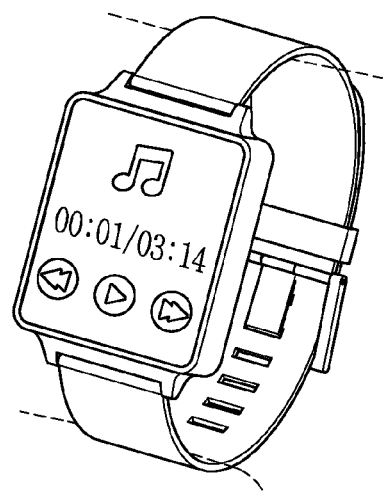

As still another example, referring to FIGS. 12D (a) and (b), if a short touch or long touch is applied to the third area in a state in which the indicator indicates any one of the graphic images, the indicated graphic image may be selected. A function linked with the indicated graphic image may be performed in response to the selection. The linked function may become an execution screen of the specific function or a response screen with respect to the selection. The example of FIGS. 12D (a) and (b) may be independently performed, but may be performed subsequent to the examples of FIGS. 12A (a) and (b) to 12C (a) and (b).

Figure 13:
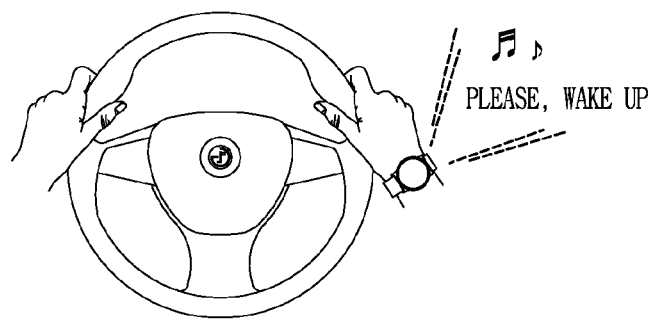
FIGS. 13, 14(a), 14(b), and 14(c) are conceptual diagrams illustrating a method for controlling a notification function using a band unit.
Figure 14C:
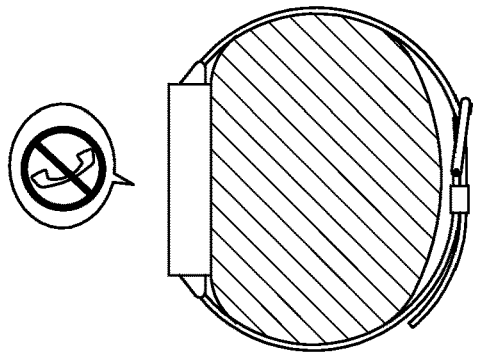
Figure 14B:
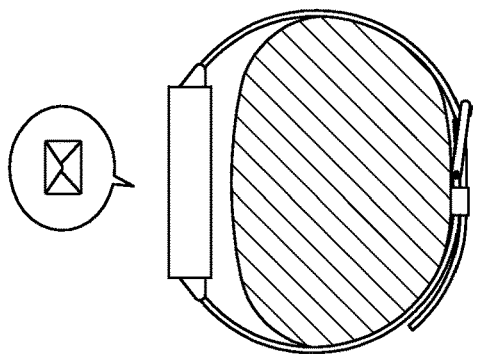
Figure 14A:
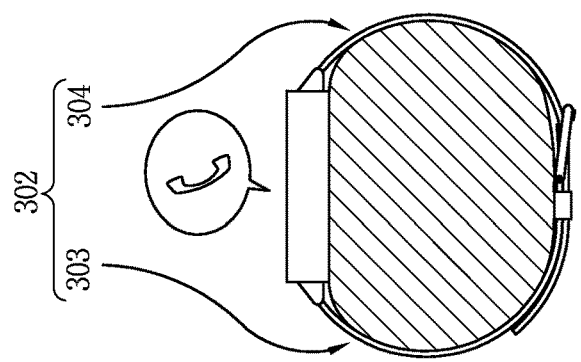

Exemplary embodiments in which notification output in the mobile terminal is controlled using a user input applied to the band unit will be described in detail with reference to the accompanying drawings. FIGS. 13 and 14 (*a*)-(*c*) are conceptual diagrams illustrating a method for controlling a notification function using the band unit.

Referring to FIG. 13, if an alarm rings through setting of an alarm application, a user input is applied to the band unit 302, controls the alarm. As another example, if an alarm for notifying that a specific event has occurred in a message application, an email application or calendar application is generated, a user input is applied to the band unit 302, thereby controlling the alarm. The specific event may include the reception of a message, the reception of an email, the occurrence of a specified schedule, or the like.

The user input for controlling at least one of the alarms may be a short touch, tapping, long touch, drag, swipe or the like. If a swipe is applied in the width or length direction to the band unit, the sensing unit may sense the swipe, and the controller may release or stop the alarm in response to the sensing. The swipe may be sensed in the third area 305*c* (see FIG. 4) and the first area 305*a* (see FIG. 4).

Further, when the user input (e.g., the short touch, tapping, long touch, drag, swipe or the like) for controlling at least one of the alarms is applied to the band unit 302, the controller may output information related to the alarm in various manners based on a current situation in which the terminal is placed (the type of the information related to the alarm may be varied, and the information may be changed depending on a factor that generates the alarm. For example, when an alarm is generated as a message is received, information related to the alarm may be contents of the message).

As an example, when the user input for controlling the alarm is applied, the controller may output information on the alarm using a voice, based on a current position of the terminal. The information related to the alarm may be converted into sound information. The current position of the terminal may be a vehicle interior. When a user drives a vehicle, the user may have difficulty identifying a display unit through the naked eye due to safety or driving. The information related to the alarm is output via the voice corresponding to the user input with respect to the band unit 302, thereby improving user convenience.

As another example, the controller may transmit the information related to the alarm to at least one external device that communicates with the terminal, in response to the user input for controlling the alarm. The at least one external device may be a device connected to the terminal via at least one scheme including Bluetooth™, radio frequency identification (RFID), infrared data association (IrDA), ultra wideband (UWB), ZigBee™, near field communication (NFC), wireless-fidelity (Wi-Fi), Wi-Fi direct and wireless universal serial bus (wireless USB). The external device may be a speaker located in the vehicle or a wireless earphone.

If the swipe is sensed as another form of user input in the third and second areas 305*c* and 305*b* (see FIG. 4), the controller may again execute notification after a predetermined time with respect to the alarm of the alarm application. The controller may perform a function of selecting any of predetermined replay contents (a quick replay function) with respect to the alarms of the message application, the email application or the calendar application.

Controls responding to alarms may be differently set based on a type of a touch input applied to the band unit. The control responding to the alarm may be applied to a case where a call signal is received. Specifically, if a vibration or bell rings when receiving a call signal, a user input is applied to the band unit 302, thereby controlling a function related to call connection. If a swipe is applied to the third and first areas 305*c* and 305*a*, the call connection may be rejected. If the swipe is applied to the third and second areas 305*c* and 305*b*, the quick replay function may be performed. If the user touches the display unit, the call connection may be performed.

Referring to FIGS. 14 (*a*)-(*c*), a control method for responding to an alarm notifying that an event has occurred using the area of the wrist contacted with the band unit may be performed.

As a specific example, if a vibration or bell rings when receiving a call signal, the portion or area of the band unit 302 contacted with the wrist is adjusted, thereby controlling a function related to call connection.

As shown in FIG. 14 (*b*), the quick replay function may be performed in a first state in which the wrist is frequently contacted at a lower position of the band unit 302, and is not contacted with the wrist at an upper position of the band unit 302. The first state may be implemented when the user lifts the main body or separates the main body from skin by pressing both the upper and lower positions of the band unit. When a long touch is applied to the first and second bands 303 and 304, and the main body is separated from the skin, the quick replay function may be performed.

As shown in FIG. 14 (*c*), a function of rejecting a call may be performed in a second state in which the band unit 302 is frequently contacted with the wrist at the upper position of the band unit 302, and is not contacted with the wrist at the lower position of the band unit 302. The second state may be implemented when the user lifts the main body or separates the main body from the skin by pressing both the upper and lower positions of the band unit. When a long touch is applied to the first and second bands 303 and 304, and the third area 305*c* is separated from the skin, a call rejection function may be performed.

Figure 15A:
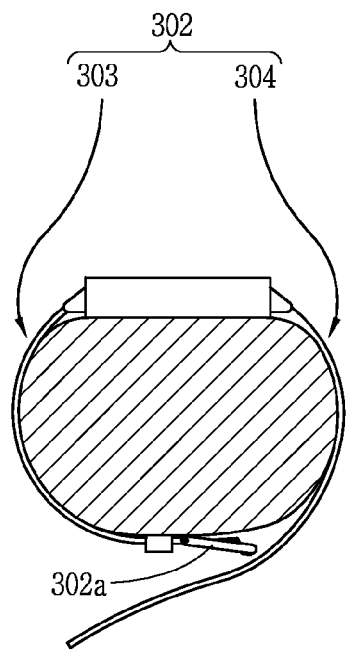
Figure 15B:
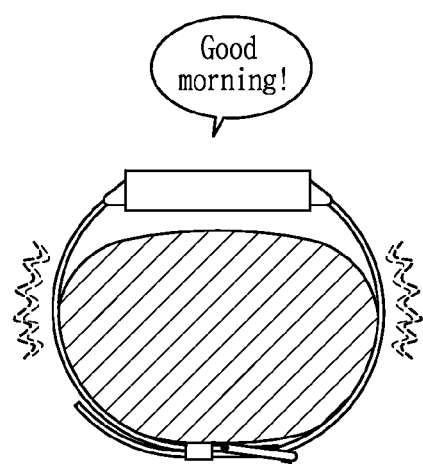

Exemplary examples in which the sensing unit is activated so that a user input is received in the band unit will be described in detail with reference to the accompanying drawings. FIGS. 15 (*a*) and (*b*) and 16 (*a*)-(*c*) are conceptual diagrams illustrating a method for activating the sensing unit. Exemplary embodiments described with reference to FIGS. 15 (*a*) and (*b*) and 16 (*a*)-(*c*) may be applied as preconditions of the previously described exemplary embodiments.

First, referring to FIGS. 15 (*a*) and (*b*), if the first and second bands 303 and 304 are connected to each other by the fastener 302*a* in a state in which the band unit 302 is wound around a wrist, thereby forming a third area 305*c*, the sensing unit may be activated. In other words, if the band unit 302 is contacted with skin as the watch type mobile terminal is worn on the wrist, the sensing unit may be activated. A function of sensing a user input is activated in the band unit by the activation of the sensing unit.

As an example, as shown in FIG. 15 (*b*), the controller may generate feedback for notifying the activation of the sensing unit. The feedback may be generation of vibration. As another example, the controller may generate, as sound notification, a predetermined notification sound such as 'Good morning!'. As still another example, the controller may notify that the band unit starts sensing a user input using screen conversion, or the like.

Referring to FIGS. 16 (*a*)-(*c*), the activation of the sensing unit may be performed even when the band unit is not contacted with the skin. For example, the activation of the sensing unit may be performed when the first and second bands 303 and 304 are fastened to each other by the fastener 302*a*.

As a more specific example, when the first and second bands 303 and 304 are connected to each other by the fastener 302*a* to generate the third area 305*c*, but the band unit is not contacted with the skin as shown in FIG. 16 (*a*), the sensing unit may be activated. The controller decides that the band unit is not wound around the wrist, thereby performing a watch function. As shown in FIG. 16 (*a*), a user input applied to the band unit in this state may be processed as a control command related to the watch function. The control command related to the watch function may be time adjustment, alarm setting, or the like.

As another example, when the first and second bands 303 and 304 are connected to each other by the fastener 302*a* to generate the third area 305*c*, but the band unit is not contacted with the skin as shown in FIG. 16 (*b*), the terminal senses this state. The controller decides that the band unit is not wound around the wrist, so that both the sensing unit and the display unit can be non-activated. Thus, as shown in FIG. 16 (*b*), no processing is generated even though a user input is applied to the band unit.

As still another example, when the first and second bands 303 and 304 are connected to each other by the fastener 302*a* to generate the third area 305*c*, but the band unit is not contacted with the skin as shown in FIG. 16 (*a*), the sensing unit is activated. If a user input is applied to the band unit, functions except the previously described watch function are performed. If the first and second bands 303 and 304 are connected to each other without any contact of the skin with the band unit, the watch function is basically performed. In this state, the sensing unit is activated. Subsequently, if a user input is applied to the band unit, a specific function or specific application performed when the band unit is wound around the wrist is performed. For example, the sensing unit is activated in the watch function as shown in FIG. 16 (*c*). If a touch is applied to the band unit, the exercise mode is executed.

Figure 17A:
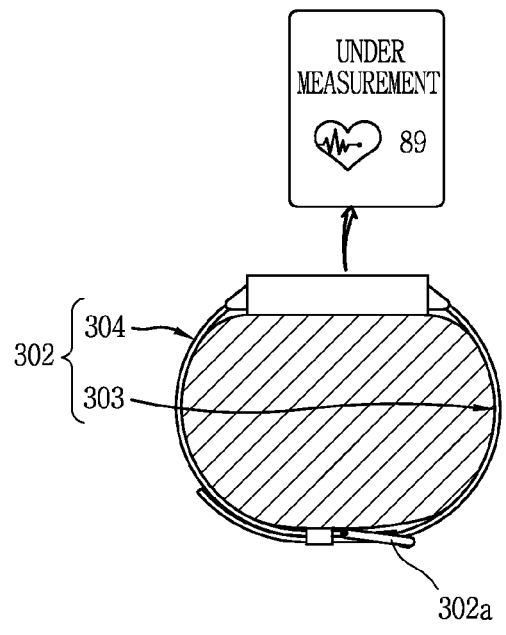
Figure 17B:
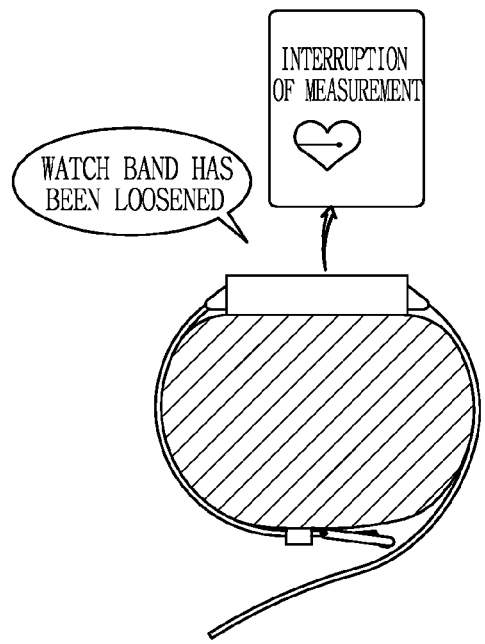

Embodiments in which control processing is changed depending on fastening of the band unit will be described in detail with reference to the accompanying drawings. FIGS. 17 (*a*) and (*b*) and 18 (*a*) and (*b*) are conceptual diagrams illustrating control methods based on fastening of the band unit.

Referring to FIGS. 17 (*a*) and (*b*) and 18 (*a*) and (*b*), the controller processes different control commands based on when a user input is applied in a state in which the first and second bands 303 and 304 are fastened to each other and when a user input is applied in a state in which the fastening between the first and second bands 303 and 304 is released. The terminal is formed to sense the state in which the first and second bands 303 and 304 are fastened to each other and the state in which the fastening between the first and second bands 303 and 304 is released. If the fastening between the first and second bands 303 and 304 is released, the controller may stop a function being executed in the state in which the first and second bands 303 and 304 are fastened to each other.

Referring to FIGS. 17 (*a*) and (*b*), if fastening between the first and second bands 303 and 304 is released in a state in which the sensing unit is activated, a specific function is executed, and when the first and second bands 303 and 304 are fastened to each other, the specific function is stopped.

As an example, a blood pressure check mode is executed in the state in which the first and second bands 303 and 304 are fastened to each other. If the fastening between the first and second bands 303 and 304 is released while a living-body recognition sensor is being operated, the living-body recognition sensor is stopped so that the blood pressure measurement is stopped.

If the fastening is released, notification information for notifying that the performance of the specific function is impossible may be output. The terminal may notify that the performance of another function is possible. For example, the terminal may notify that the measurement of body temperature is possible. However, the activation of the sensing unit is continuously maintained such that a user input with respect to the band unit is possible. The user input applied to the band unit in the state in which the fastening is released, for example, may be defined as an input for ending the specific function.

As another example, the starting of a specific function may be changed depending on whether the band unit is contacted with or fastened to the skin. If a user input for performing a specific function (e.g., pressure measurement) is input in the state in which the band unit is not contacted with the skin, or the fastening is released, notification information for notifying that the performance of the specific function is impossible may be output. The notification information may be output as information using any visual, auditory or tactile manner.

As still another example, notification information may be generated based on a user's life pattern. In the state in which the band unit is not contacted with the skin or the fastening is released even though it is time set to measure blood pressure, notification information for notifying this may be output.

As shown in FIGS. 18 (a) and (b), if fastening between the first and second bands 303 and 304 is released in a state in which the band unit is not contacted with skin, but the sensing unit is activated, a specific function is performed, and if the first and second bands 303 and 304 are fastened to each other, the performance of the specific function is stopped. More specifically, a watch function is performed in a state in which the band unit is not contacted with skin, but the first and second bands 303 and 304 are fastened to each other. If the fastening between the first and second bands 303 and 304 is released, the operation of the watch function is stopped so that the display unit is non-activated. If the fastening between the first and second bands 303 and 304 is released while the watch function is being performed as described in the exemplary embodiment of FIGS. 16 (a)-(c) in the state in which it is determined that the watch type mobile terminal is not worn, the performance of the watch function is stopped.

In the present invention, by applying an input to the watch type mobile terminal using the band unit, user convenience can be enhanced. Since the band unit is divided into areas for receiving different control commands, various input methods can be implemented.

Further, in the present invention, since a portion at which the bands are overlapped with each other is used as an input area, an input method when the watch type mobile terminal is worn may be different from an input method when the watch type mobile terminal is not worn. In addition, it is possible to implement a user input unit of a hybrid type, in which both touch key and physical key inputs are possible at a portion where the bands are overlapped (or fastened) with each other.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. The machine-readable medium may be realized in the form of a carrier wave (for example, a transmission over the Internet). The processor may include the controller 180 of the mobile terminal.

The foregoing embodiments and advantages are merely exemplary and are not to be construed as limiting the present invention. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A watch-type mobile terminal that is wearable on a user's wrist, the terminal comprising:
a main body comprising a display unit;
a band unit connected to the main body such that the band unit surrounds the user's wrist when the mobile terminal is worn by the user, the band unit comprising first and second bands each connected to a different side of the main body, a first area formed in the first band, a second area formed in the second band, and a third area formed in a region where the first and second bands overlap each other or are connected to each other;
a sensing unit configured to sense a user input applied to the first area, the second area or the third area; and
a controller configured to:
process a different command based on whether the user input is sensed when the first and second bands are connected to each other or when the first or second bands are released from each other;
process one of a plurality of different commands based on whether the user input is sensed on the first area, the second area or the third area;
perform a function corresponding to the one of the plurality of different commands when the first and second bands are connected to each other; and
stop performing the function when the first and second bands are subsequently released from each other.

2. The mobile terminal of claim 1, wherein the third area is an area where end portions of the first and second bands are connected to each other.

3. The mobile terminal of claim 1, wherein the band unit comprises the sensing unit.

4. The mobile terminal of claim 3, wherein the controller is further configured to process a different control command according to a type of each of a plurality of touch inputs sensed at a same area of the band unit.

5. The mobile terminal of claim 1, wherein the controller is further configured to control the display unit according to the processed one of the plurality of different commands.

6. The mobile terminal of claim 5, wherein the controller is further configured to control the display unit to change at least one portion of displayed screen information according to the processed one of the plurality of different commands.

7. The mobile terminal of claim 6, wherein the controller is further configured to control the display unit to move an indicator for selecting an object in the displayed screen information according to the processed one of the plurality of different commands.

8. The mobile terminal of claim 1, wherein the controller is further configured to perform control related to an event if the user input is sensed when the event occurs.

9. The mobile terminal of claim 8, wherein the controller is further configured to generate notification information indicating that the event has occurred, the notification information generated according to the sensed user input.

10. The mobile terminal of claim 8 further comprising an output unit, wherein the controller is further configured to control the output unit to output information related to the event via at least one predetermined manner that corresponds to the sensed user input.

11. The mobile terminal of claim 8, further comprising an output unit, wherein the controller is further configured to control the output unit to transmit predetermined information to another terminal in response to the sensed user input, the predetermined information related to the event.

12. The mobile terminal of claim 1, wherein:
the first band is connected to a first side of the main body and the second band is connected to a second side of the main body such that a double band unit is formed by overlapping the first and second bands or by connection between the first and second bands; and
the sensing unit is further configured to sense a user input applied to the double band unit.

13. The mobile terminal of claim 12, wherein the controller is further configured to process the sensed user input applied to the double band unit as a different control command according to a position on the double band unit at which the user input is sensed.

14. The mobile terminal of claim 12, wherein the user input applied to the double band unit includes movement with respect to at least one portion of the first and second bands.

15. The mobile terminal of claim 1, wherein the controller is further configured to execute an operation mode regardless of whether the display unit is activated.

16. The mobile terminal of claim 15, wherein the controller is further configured to control a function performed in the executed operation mode according to an additional user input applied to the band unit.

17. The mobile terminal of claim 15, wherein:
the user input is one of a plurality of touch inputs applied to the band unit; and
each of the plurality of touch inputs is defined as an execution command with respect to a corresponding one of a plurality of operation modes.

18. The mobile terminal of claim 1, further comprising an output unit, wherein the controller is further configured to control the output unit to output notification information for notifying that performance of the function is no longer possible when the first and second bands are subsequently released from each other.

* * * * *